US012442479B1

(12) United States Patent
Botts et al.

(10) Patent No.: US 12,442,479 B1
(45) Date of Patent: Oct. 14, 2025

(54) UNDERGROUND PIPE REPAIR SYSTEM WITH LINER ASSEMBLY AND RELATED METHODS

(71) Applicant: IMPROVED INFRASTRUCTURE SOLUTIONS, LLC, Winter Park, FL (US)

(72) Inventors: Jerold L. Botts, Winter Park, FL (US); Cleatous J. Simmons, Winter Park, FL (US)

(73) Assignee: IMPROVED INFRASTRUCTURE SOLUTIONS, LLC, Orlando, FL (US)

( * ) Notice: Subject to any disclaimer, the term of this patent is extended or adjusted under 35 U.S.C. 154(b) by 361 days.

(21) Appl. No.: 18/053,105

(22) Filed: Nov. 7, 2022

Related U.S. Application Data

(60) Provisional application No. 63/367,599, filed on Jul. 1, 2022, provisional application No. 63/263,624, filed on Nov. 5, 2021.

(51) Int. Cl.
| | |
|---|---|
| *F16L 55/18* | (2006.01) |
| *F16L 55/163* | (2006.01) |
| *F16L 55/165* | (2006.01) |
| *F16L 55/28* | (2006.01) |

(52) U.S. Cl.
CPC .......... *F16L 55/1654* (2013.01); *F16L 55/18* (2013.01); *F16L 55/28* (2013.01)

(58) Field of Classification Search
CPC ......... F16L 55/179; F16L 55/18; F16L 55/26; F16L 55/48; F16L 55/1651; F16L 55/1652; F16L 55/1654
See application file for complete search history.

(56) References Cited

U.S. PATENT DOCUMENTS

| | | | | |
|---|---|---|---|---|
| 5,253,956 | A | * 10/1993 | Fisco | F16L 55/179 |
| | | | | 405/184.2 |
| 5,598,873 | A | * 2/1997 | Kamiyama | F16L 55/179 |
| | | | | 138/97 |

(Continued)

FOREIGN PATENT DOCUMENTS

| | | | | |
|---|---|---|---|---|
| AU | 4429299 | A * | 2/2000 | |
| AU | 2011312004 | A1 * | 5/2013 | B23P 11/02 |

(Continued)

*Primary Examiner* — Frederick L Lagman
(74) *Attorney, Agent, or Firm* — Allen, Dyer, Doppelt + Gilchrist. P.A.

(57) ABSTRACT

An underground pipe repair system is for a branch pipe connecting with a service pipe. The underground pipe repair system includes a robot device with an inflation tool, a processor, and a housing carrying the inflation tool and the processor. The underground pipe repair system also includes a liner assembly having an inverted liner including a proximal end coupled to the inflation tool, and a distal end opposite the proximal end, and an electronic curing device coupled to the distal end and within the inverted liner. The processor is configured to cause the robot device to move through the service pipe, determine a position of the branch pipe, operate the inflation tool to invert and cause the inverted liner to inflate within the branch pipe and position the electronic curing device within the inflated liner, and activate the electronic curing device to cure the inflated liner within the branch pipe.

20 Claims, 22 Drawing Sheets

(56) References Cited

U.S. PATENT DOCUMENTS

| | | | | |
|---|---|---|---|---|
| 5,700,110 | A * | 12/1997 | Kamiyama | F16L 55/179 405/184.2 |
| 6,029,726 | A * | 2/2000 | Tweedie | B29C 63/28 156/380.9 |
| 6,364,991 | B1 * | 4/2002 | Rice | B29C 63/34 156/391 |
| 7,131,791 | B2 * | 11/2006 | Whittaker | G01M 3/005 405/184.2 |
| 8,715,442 | B2 * | 5/2014 | Kamiyama | F16L 55/179 156/196 |
| 8,844,577 | B2 * | 9/2014 | Kiest, Jr. | F16L 9/14 138/104 |
| 8,869,839 | B1 * | 10/2014 | D'Hulster | F16L 55/18 405/184.2 |
| 9,261,221 | B2 * | 2/2016 | Kiest, Jr. | F16L 55/1653 |
| 9,341,302 | B2 * | 5/2016 | Kiest, Jr. | F16L 55/179 |
| 10,247,348 | B2 | 4/2019 | Meier | |
| 11,028,955 | B2 * | 6/2021 | Kiest, Jr. | F16L 55/1651 |
| 11,326,732 | B2 * | 5/2022 | Botts | F16L 55/165 |
| 2010/0154187 | A1 * | 6/2010 | Kamiyama | F16L 55/1656 29/402.16 |
| 2012/0103514 | A1 * | 5/2012 | Kamiyama | F16L 55/265 156/423 |
| 2020/0173599 | A1 * | 6/2020 | Baxter | E03B 7/006 |
| 2020/0408348 | A1 * | 12/2020 | Botts | F16L 55/18 |
| 2021/0285590 | A1 * | 9/2021 | Kiest, Jr | F16L 55/26 |

FOREIGN PATENT DOCUMENTS

| | | | | |
|---|---|---|---|---|
| AU | 2013279089 A1 * | 2/2015 | | F16L 55/163 |
| KR | 20180109803 A * | 10/2018 | | |

* cited by examiner

UNDERGROUND PIPE REPAIR SYSTEM WITH LINER ASSEMBLY AND RELATED METHODS

RELATED APPLICATION

This application is based upon prior filed copending Application No. 63/367,599 filed Jul. 1, 2022 and copending Application No. 63/263,624 filed Nov. 5, 2021, the entire subject matter of which is incorporated herein by reference in its entirety.

TECHNICAL FIELD

The present disclosure relates to the field of underground pipe repair, and, more particularly, to underground sewer pipe repair devices and related methods.

BACKGROUND

Pervasive gravity based sewer systems have been the hallmark of advanced human civilization since the Roman Empire. In most modern metropolitan applications, the service sewer pipe (i.e. the "main") runs along a street, and adjacent properties each connect to the service sewer pipe via a respective branch sewer pipe. Over time, subterranean pressure and moisture cause deterioration in a joint between each branch sewer pipe and the service sewer pipe. One approach is to excavate and replace each of the branch and service sewer pipes. Of course, although functionally ideal, the approach is very expensive and disruptive to property owners.

Another approach to this issue is excavationless/trenchless repair of the branch and service sewer pipes via a relining process. In particular, the approach includes relining the joint between each branch sewer pipe and the service sewer pipe. In typical approaches to fixing a leak in the sewer connection, a new liner is applied to the service sewer pipe. The branch sewer pipe also receives a new liner. The prior art process includes applying a specially shaped liner for the joint, for example, a vertically inverted T-shaped liner that extends upward into the branch sewer pipe. The typical approach includes subsequently applying a new liner for the service sewer pipe. The problem with this approach is that the joint portion of the liner may be damaged during the application of the liner for service sewer pipe, in particular, the steps of curing the liner for the service sewer pipe and cutting an opening in that new liner of the service sewer pipe at the joint.

SUMMARY

Generally, an underground pipe repair system is for a first pipe connecting with a second pipe. The underground pipe repair system comprises a robot device, and the robot device comprises an inflation tool, a plurality of sensors, a processor coupled to the inflation tool and the plurality of sensors, and a housing carrying the inflation tool, the plurality of sensors, and the processor. The underground pipe repair system comprises a liner assembly comprising a liner, the liner comprising a proximal end directly coupled to the inflation tool, and a distal end opposite the proximal end and to be positioned in the first pipe. The processor is configured to cause the robot device to move through the second pipe, determine a position of a joint between the first pipe and the second pipe, operate the inflation tool to cause the liner to inflate within the first pipe, and activate an electronic curing device (e.g. an ultraviolet (UV) radiation curing device) to be positioned within the inflated liner to cure the inflated liner within the first pipe.

In some embodiments, the liner may comprise an inverted liner to be inverted within the first pipe by the inflation tool. The liner assembly may include the electronic curing device coupled to the distal end and within the liner, and the electronic curing device may be dragged within the inverted liner during inflation. Also, the processor may be configured to activate the electronic curing device based upon detection of inflation of the inverted liner. In particular, the processor may be configured to activate the electronic curing device based upon internal pressure with the inflated liner exceeding a threshold pressure, or a timer expiring, for example.

In other embodiments, the electronic curing device may be positioned within the liner after inflation. The robot device may include an on-board power supply carried by the housing and coupled to the inflation tool, the plurality of sensors, and the processor. The robot device may be powered without surface based power.

Another aspect is directed to a method for operating an underground pipe repair system for repairing at least one of a first pipe and a second pipe. The method comprises positioning a robot device with a liner assembly within the second pipe, the robot device comprising an inflation tool, a plurality of sensors, a processor coupled to the inflation tool and the plurality of sensors, and a housing carrying the inflation tool, the plurality of sensors, and the processor. The liner assembly comprises a liner having a proximal end directly coupled to the inflation tool, and a distal end opposite the proximal end and to be positioned in the first pipe. The method also includes causing the robot device to move through the second pipe, determining a position of a joint between the first pipe and the second pipe, operating the inflation tool to cause the liner to inflate within the first pipe, and activating an electronic curing device to be positioned within the inflated liner to cure the inflated liner within the first pipe.

DETAILED DESCRIPTION

Figure 1:
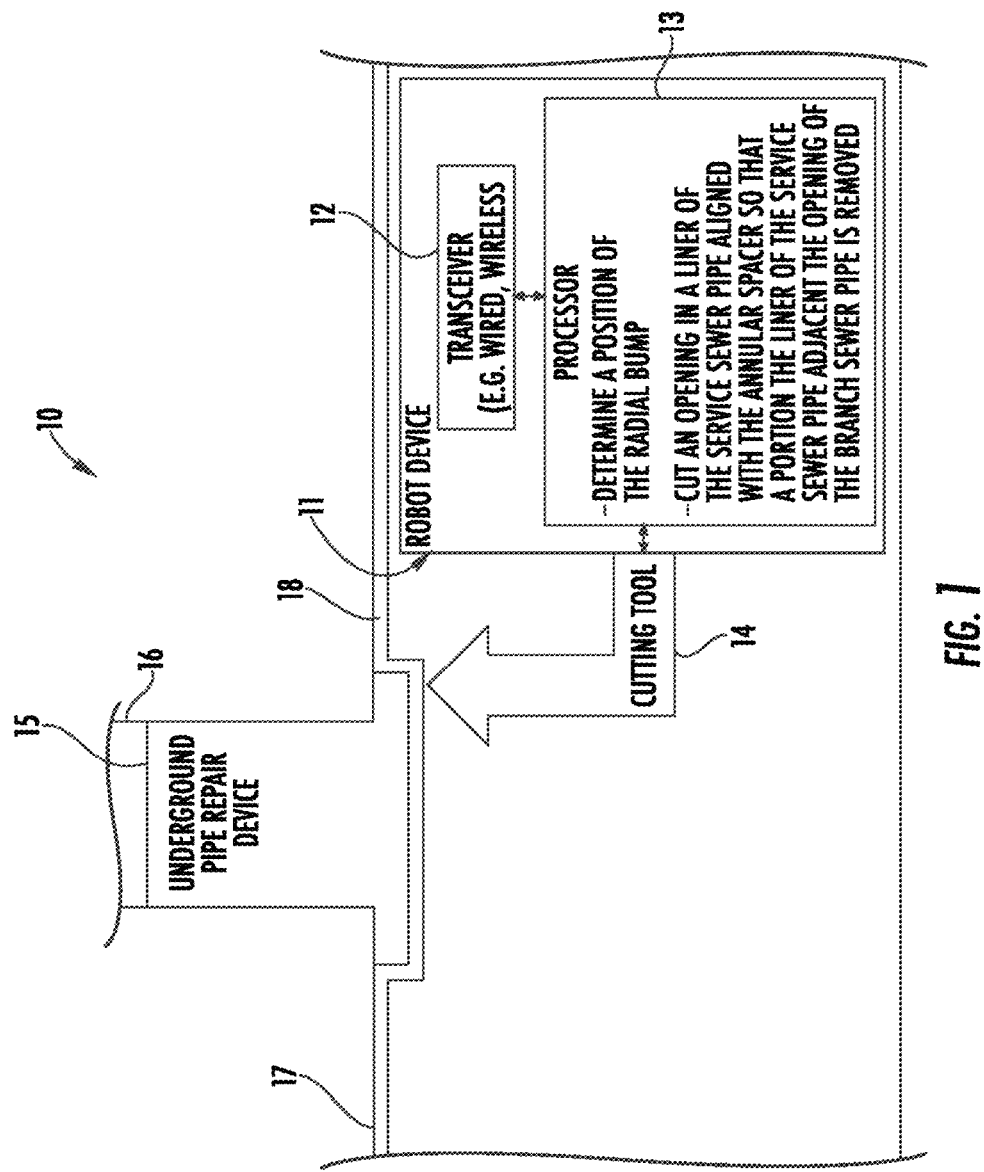
FIG. 1 is a schematic diagram of an underground pipe repair system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments. Also, base 100 reference numerals are used to indicate similar elements in alternative embodiments Referring initially to FIG. 1, an underground pipe repair system 10 for a joint between a service sewer pipe 17 and a branch sewer pipe 16. The underground pipe repair system 10 illustratively includes an underground pipe repair device 15, and a robot device 11 comprising a transceiver 12 (e.g. wired or wireless), a cutting tool 14, and a processor 13 coupled to the transceiver and the cutting tool. Although not shown, the underground pipe repair system 10 may include a surface controller configured to control operation of the robot device 11 via the transceiver 12.

The robot device 11 may include a video sensor, for example, a high definition video camera with environmental protection (e.g. water and dust proofing). The processor 13 is coupled to the video sensor, cooperates with the transceiver 12, and is configured to transmit video data from the video sensor to the controller. In some embodiments, the robot device 11 may include a battery power source coupled to the processor 13, the transceiver 12, and the cutting tool 14. In other embodiments, the robot device 11 may include a wired powered source at the surface.

The underground pipe repair device 15 illustratively includes a first T-shaped joint liner 19 having a base portion 21 extending laterally in the service sewer pipe 17, and an arm portion 20 extending vertically into the branch sewer pipe 16. In some embodiments, the base portion 21 and the arm portion 20 are integral and monolithic, but in other embodiments, the base portion 21 and the arm portion 20 may be modular and coupled together via stitching, for example.

The underground pipe repair device 15 illustratively includes a second ring-shaped liner 22 under the first T-shaped joint liner 19 and aligned with an opening in the branch sewer pipe 16. The second ring-shaped liner 22 includes a medial opening positioned over the opening in the branch sewer pipe 16.

The underground pipe repair device 15 illustratively includes an annular spacer 25 aligned with the opening in the branch sewer pipe 16 and being between the first T-shaped joint liner 19 and the second ring-shaped liner 22. The annular spacer 25 includes a radial step 26. In other embodiments, the annular spacer 25 may comprise a plurality of radial steps.

The second ring-shaped liner 22 is coupled to the base portion 21 of the first T-shaped joint liner 19 to retain the annular spacer 25. The annular spacer 25 extends vertically into the service sewer pipe 17 so that the second ring-shaped liner 22 has a radial bump 23 about the opening of the branch sewer pipe 16.

The first T-shaped joint liner 19 and the second ring-shaped liner 22 each comprises a flexible curable material. The flexible curable material may be curable via ultraviolet radiation, infrared radiation (i.e. thermal energy), a chemical immersion, or water, for example.

The processor 13 is configured to cause the robot device 11 to move through the service sewer pipe 17 and determine a position of the radial bump 23, and operate the cutting tool 14 to cut an opening in a liner 18 of the service sewer pipe aligned with the annular spacer 25 so that a portion of the liner of the service sewer pipe adjacent the opening of the branch sewer pipe 16 is removed.

In the illustrated embodiment, the underground pipe repair device 15 includes a ring-shaped release tab 28 coupled to the second ring-shaped liner 22 and configured to prevent the liner 18 for the service sewer pipe 17 from bonding to adjacent portions of the second ring-shaped liner. The ring-shaped release tab 28 may be coupled to the second ring-shaped liner 22 via an adhesive layer (not shown) interposed between the ring-shaped release tab and the second ring-shaped liner. In other embodiments, the ring-shaped release tab 28 may be coupled to the second ring-shaped liner 22 via mechanical interface, such as buttons, rivets, for example.

During repair of the joint, the liner 18 for the service sewer pipe 17 is installed and cured after the installation and curing of the first T-shaped joint liner 19. The ring-shaped release tab 28 provides a barrier between adjacent portions 24 of the liner 18 for the service sewer pipe 17 and the first T-shaped joint liner 19. In typical approaches, the curing of the liner 18 for the service sewer pipe 17 may damage the adjacent portions of the first T-shaped joint liner 19, but in the disclosed approach, the ring-shaped release tab 28 provides protection from the second curing process. In fact, once the robot device 11 performs the cutting operation, the portion of the liner 18 of the service sewer pipe 17 adjacent the opening of the branch sewer pipe 16 is released.

In some embodiments (FIG. 5), the annular spacer 25 defines a plurality of radial gaps. During installation of the underground pipe repair device 15 at the joint, the annular spacer 25 is configured to flex to fit the opening in the branch sewer pipe 16. For example, the annular spacer 25 may be ellipse-shaped, or circle-shaped. The annular spacer 25 can be filled with a sealant to act as a gasket, further enhancing a seal between the service pipe liner and the first T-shaped joint liner 19.

The radial step 26 of the annular spacer 25 defines a pair of radial portions 27a-27b. Each radial portion 27a-27b of the annular spacer 25 has a different readily identifiable color (e.g. a bright primary color). Also, the annular spacer 25 may comprise a plastic material, and/or a frangible material (i.e. permitting the cutting tool 14 to readily remove portions of the annular spacer). Advantageously, the user operating the robot device 11 may precisely control the cutting step via the color indicators. This is in contrast to typical approaches where the user could inadvertently puncture the replacement liner.

Moreover, the stepped shape of the annular spacer enables the robot device 11 to be equipped with a lateral cutting tool, i.e. the cutting blade is parallel to the service sewer pipe 17. This horizontal cutting blade also prevents damage to the replacement liner since a vertical blade is not used.

In the illustrated embodiment, the joint is between the service sewer pipe 17 and the branch sewer pipe 16. In other embodiments, the underground pipe repair system 10 can be used on other underground pipe systems (e.g. storm water, drainage) where trenchless repair is desirable.

Figure 4:
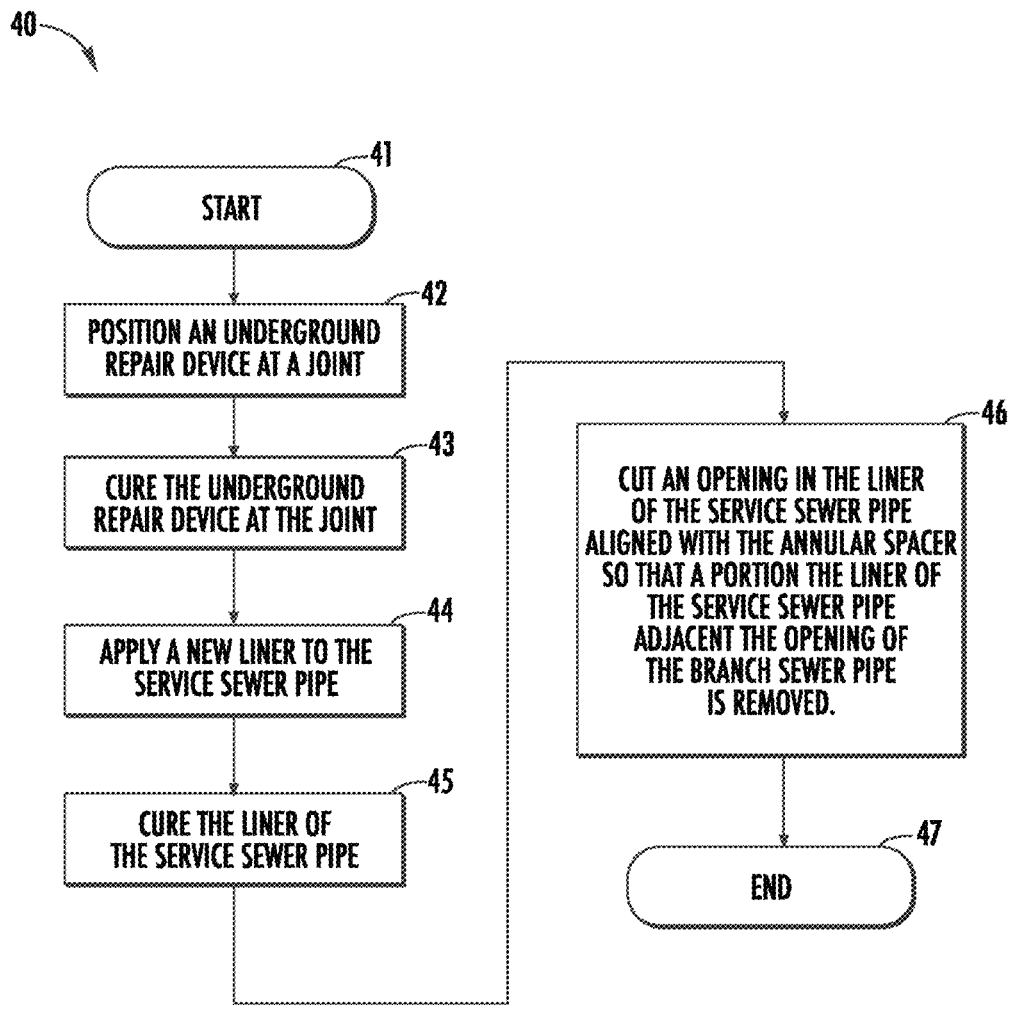
FIG. 4 is a flowchart illustrating a method for operating the underground pipe repair system of FIG. 1.

Referring now additionally to FIG. 4 and to a flowchart 40 therein, another aspect is directed to a method for operating an underground pipe repair system 10 for repairing a joint between a service sewer pipe 17 and a branch sewer pipe 16. The method comprises positioning an underground pipe repair device 15 at the joint. (Blocks 41-42). The underground pipe repair device 15 comprises a first T-shaped joint liner 19 having a base portion 21 extending laterally in the service sewer pipe 17, and an arm portion 20 extending vertically into the branch sewer pipe 16, and a second ring-shaped liner 22 under the first T-shaped joint liner and aligned with an opening in the branch sewer pipe.

The underground pipe repair device 15 comprises an annular spacer 25 aligned with the opening in the branch sewer pipe 16 and being between the first T-shaped joint liner 19 and the second ring-shaped liner 22. The annular spacer 25 includes at least one radial step 26, and the second ring-shaped liner 22 is coupled to the base portion 21 of the first T-shaped joint liner 19 to retain the annular spacer. The annular spacer 25 extends vertically into the service sewer pipe 17 so that the second ring-shaped liner 22 has a radial bump 23 about the opening of the branch sewer pipe 16.

The method also includes curing the underground pipe repair device 15 to the joint (Block 43), applying and curing a liner 18 for the service sewer pipe 17 (Blocks 44-45), and cutting an opening in the liner of the service sewer pipe aligned with the annular spacer 25 so that a portion the liner of the service sewer pipe adjacent the opening of the branch sewer pipe 16 is removed. (Blocks 46-47).

Figure 2:
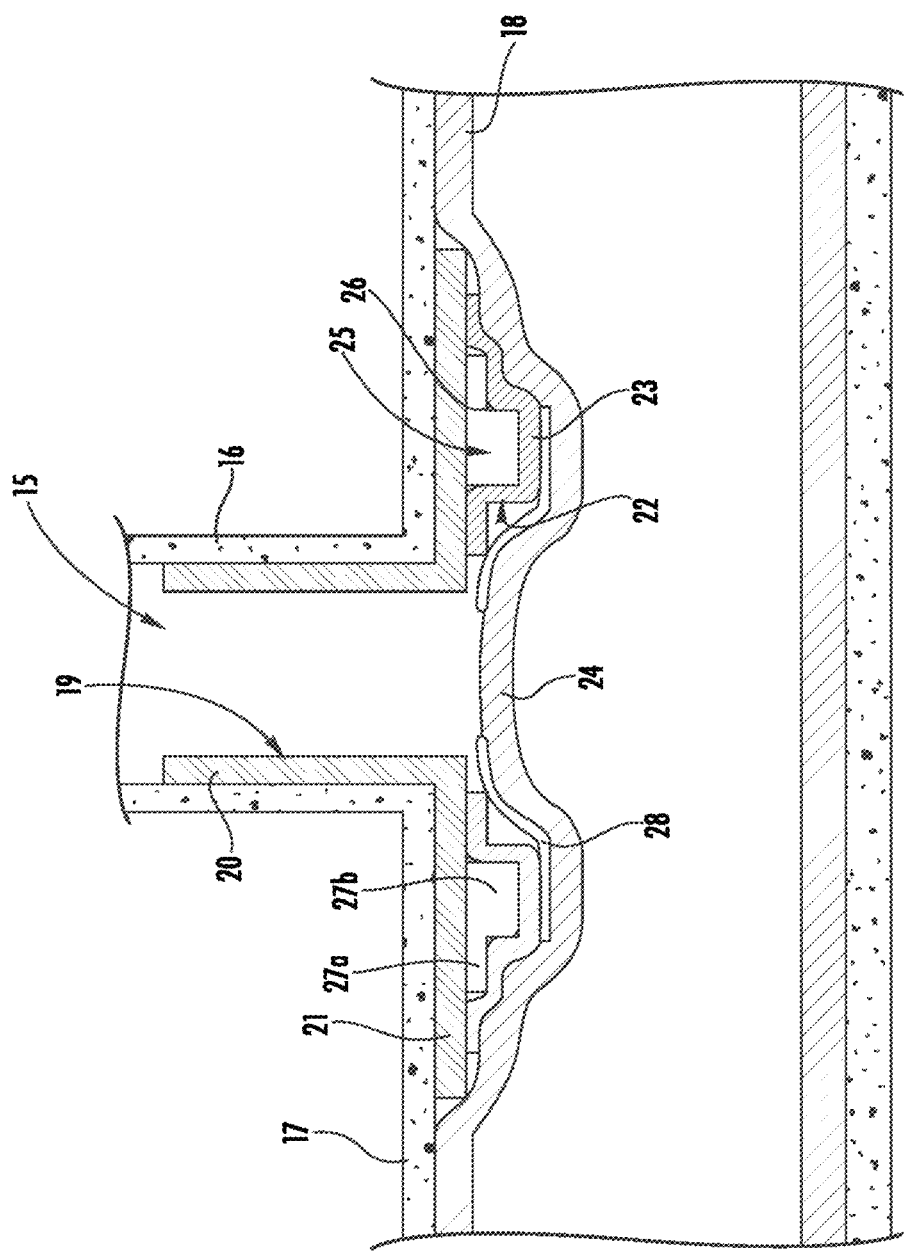
FIG. 2 is a schematic diagram of an underground pipe repair device, according to a first example embodiment.

In some embodiments (FIG. 2), the underground pipe repair device 15 may comprise a ring-shaped release tab 28 coupled to the second ring-shaped liner 22, and the method may further comprise preventing the liner 18 for the service sewer pipe 17 from bonding to adjacent portions of the second ring-shaped liner. In other embodiments (FIG. 3), the underground pipe repair device 15 may include a coating layer 28' on the second ring-shaped liner 22, and the method may further comprise preventing the liner 18 for the service sewer pipe 17 from bonding to adjacent portions of the second ring-shaped liner.

Also, the annular spacer 25 may define a plurality of radial gaps, and the method may further comprise flexing a shape of the annular spacer to fit the opening in the branch sewer pipe 16. The at least one radial step 26 of the annular spacer 25 may define at least one pair of radial portions 27a-27b, and each radial portion of the annular spacer may have a different color. The method may also comprise controlling the cutting based upon visibility of the different color of each radial portion 27a-27b.

Figure 3:
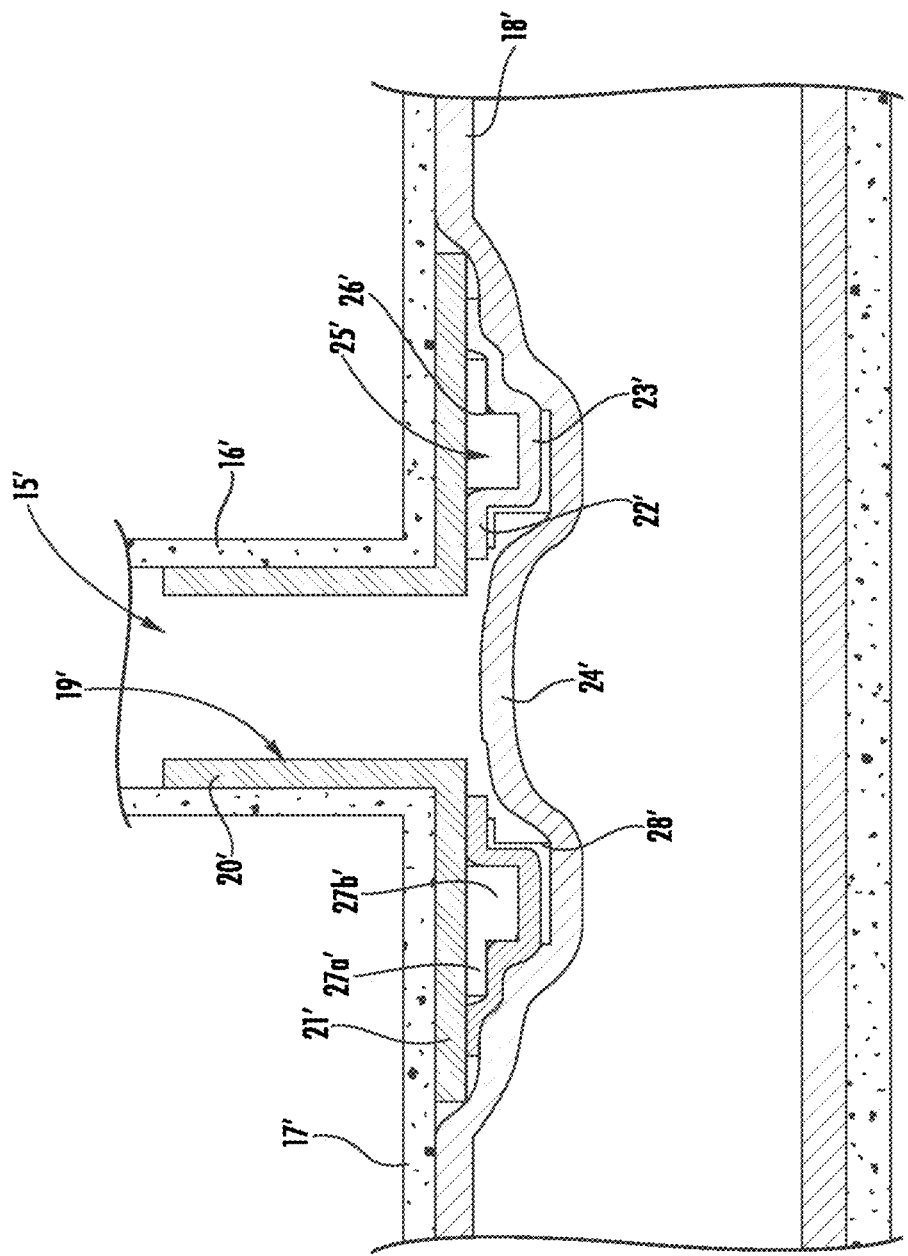
FIG. 3 is a schematic diagram of an underground pipe repair device, according to a second example embodiment.

Referring now additionally to FIG. 3, another embodiment of the underground pipe repair device 15' is now described. In this embodiment of the underground pipe repair device 15', those elements already discussed above with respect to FIGS. 1-2 are given prime notation and most require no further discussion herein. This embodiment differs from the previous embodiment in that this underground pipe repair device 15' has a coating layer 28' on the second ring-shaped liner 22' and configured to prevent the liner 18' for the service sewer pipe 17' from bonding to adjacent portions of the second ring-shaped liner. The coating layer 28' may comprise a material that has chemically resistant characteristics to the curing process of the liner 18' for the service sewer pipe 17'. The material may comprise polytetrafluoroethylene (PTFE), for example.

Figure 5:
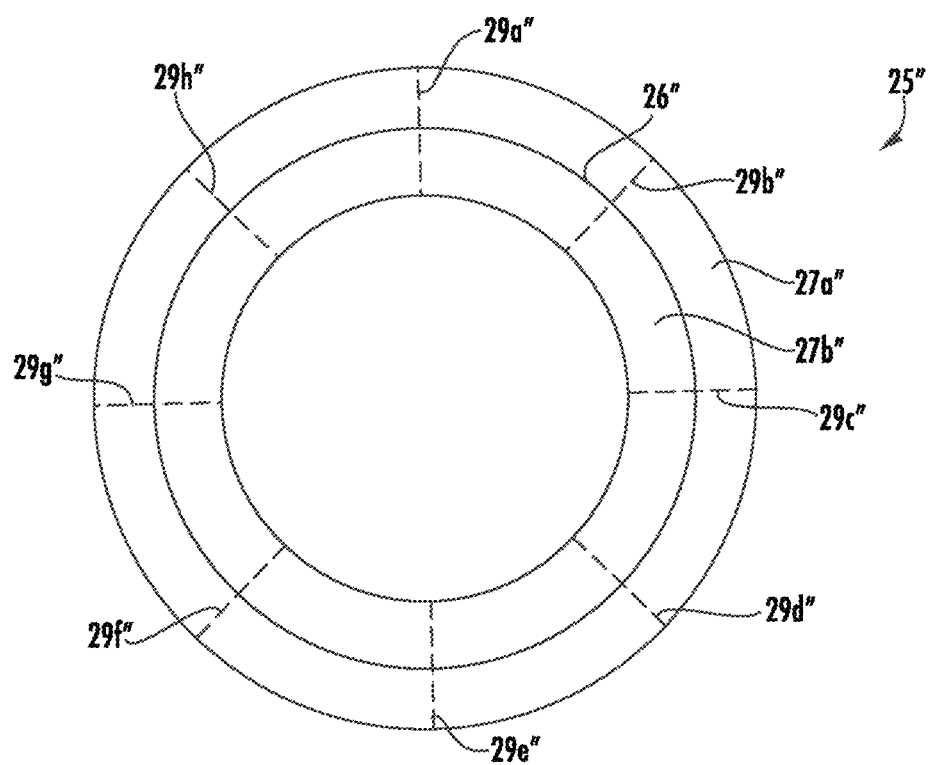
FIG. 5 is a schematic top plan view of another embodiment of the annular spacer from the underground pipe repair device, according to an example embodiment.

Referring now additionally to FIG. 5, another embodiment of the annular spacer 25" is now described. In this embodiment of the annular spacer 25", those elements already discussed above with respect to FIGS. 1-2 are given double prime notation and most require no further discussion herein. This embodiment differs from the previous embodiment in that this annular spacer 25" illustratively includes a plurality of radial gaps 29a"-29h". The plurality of radial gaps 29a'‑29h" permits the annular spacer 25" to flex and fit a branch pipe opening. In the illustrated embodiment, the plurality of radial gaps 29a"-29h" is spaced at approximately 45 degrees, but other arrangements are possible, for example, spacing being >10 degrees, and <90 degrees.

Figure 6:
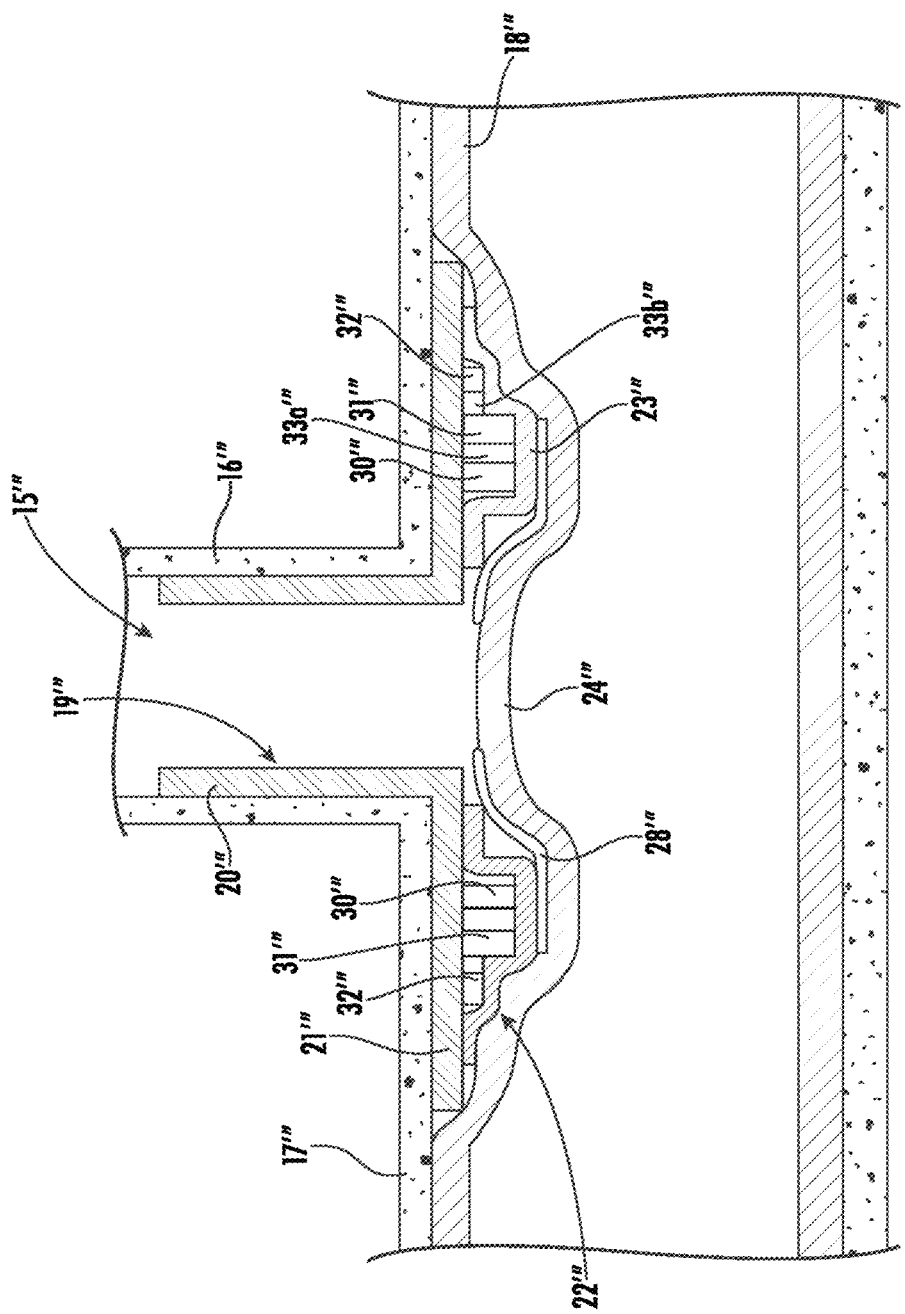
FIG. 6 is a schematic diagram of an underground pipe repair device, according to a third example embodiment.

Referring now additionally to FIG. 6, another embodiment of the underground pipe repair device 15''' is now described. In this embodiment of the underground pipe repair device 15''', those elements already discussed above with respect to FIGS. 1-3 & 5 are given triple prime notation and most require no further discussion herein.

This embodiment differs from the previous embodiment in that this underground pipe repair device 15''' illustratively includes a first T-shaped joint liner 19''' having a base portion 21''' extending laterally in the service pipe 17''', and an arm portion 20''' extending vertically into the branch pipe 16''', and a first annular spacer 30''' aligned with an opening in the branch pipe and being coupled to an underside of the first T-shaped joint liner. The underground pipe repair device illustratively includes a second annular spacer 31''' aligned with the opening in the branch pipe and being coupled to the underside of the first T-shaped joint liner 19'''. The first annular spacer 30''' is radially within the second annular spacer 31'''.

The underground pipe repair device 15''' illustratively includes a third annular spacer 32''' aligned with the opening in the branch pipe 16''' and being coupled to the underside of the first T-shaped joint liner 19'''. The second annular spacer 31''' is radially within the third annular spacer 32'''.

One or both of second annular spacer 31''' and the third annular spacer 32''' comprise a swellable seal. In particular, the swellable seal is a seal that swells in the presence of moisture (e.g. a water swellable material). The swellable seal may comprise one or more of a swellable seal, a bonding agent, a hydrophilic substance, and/or sealant. Once the underground pipe repair device 15''' is installed at the branch pipe 16''', as ground water attempts to penetrate laterally from the service pipe liner 18", the swellable annular spacers will expand and create a radial seal between the base portion 21'" of the first T-shaped joint liner 19" and the second ring-shaped liner 22'". The service pipe liner 18"

One or both of second annular spacer 31'" and the third annular spacer 32'" comprise a color coded frangible indicator material (e.g. color coded polymer plastic) for indicating a location of a cutting incision. Also, the first, second, and third annular spacers 30'"-32'" define first and second annular gaps 33a'"-33b'" therebetween.

In the illustrated embodiment, the underground pipe repair device 15'" illustratively includes a second ring-shaped liner 22'" under the first T-shaped joint liner 19'" and aligned with the opening in the branch pipe 16'". The second ring-shaped liner 22'" is coupled to the base portion 21'" of the first T-shaped joint liner 19'" to retain the first annular spacer 30'", the second annular spacer 31'", and the third annular spacer 32'". The underground pipe repair device illustratively includes a ring-shaped release tab 28'" coupled to the second ring-shaped liner 22'" and configured to prevent a liner 18'" for the service pipe 17'" from bonding to adjacent portions of the second ring-shaped liner. In other embodiments (similar to the embodiment of FIG. 3), the underground pipe repair device 15'" may further comprise a coating layer on the second ring-shaped liner 22'" and configured to prevent the liner 18'" for the service pipe 17'" from bonding to adjacent portions of the second ring-shaped liner.

In some embodiments, the second ring-shaped liner 22'" and the ring-shaped release tab 28'" (or coating layer) are omitted. In these embodiments, the swellable annular spacers will expand and create the radial seal between the base portion 21'" of the first T-shaped joint liner 19" and the liner 18'" for the service pipe 17'".

Also, the first annular spacer 30'" illustratively extends vertically into the service pipe 17'" so that the liner 18'" for the service pipe has a radial bump 23'" about the opening of the branch pipe 16'". The first annular spacer 30'" and the second annular spacer 31'" each illustratively has a greater height than the third annular spacer 32'". The first and second annular spacers 30'", 31'" each may comprise a plastic material. Each of the first annular spacer 30'" and second annular spacer 31'" may have a different color. The first annular spacer 30'" may comprise a frangible material.

In other embodiments, the underground pipe repair device 15'" may include additional annular spacers above and beyond the first, second, and third annular spacers 30'"-32'". The additional annular spacers may comprise either swellable material for providing more annular seals or frangible material for additional cutting indicators.

Figure 7:
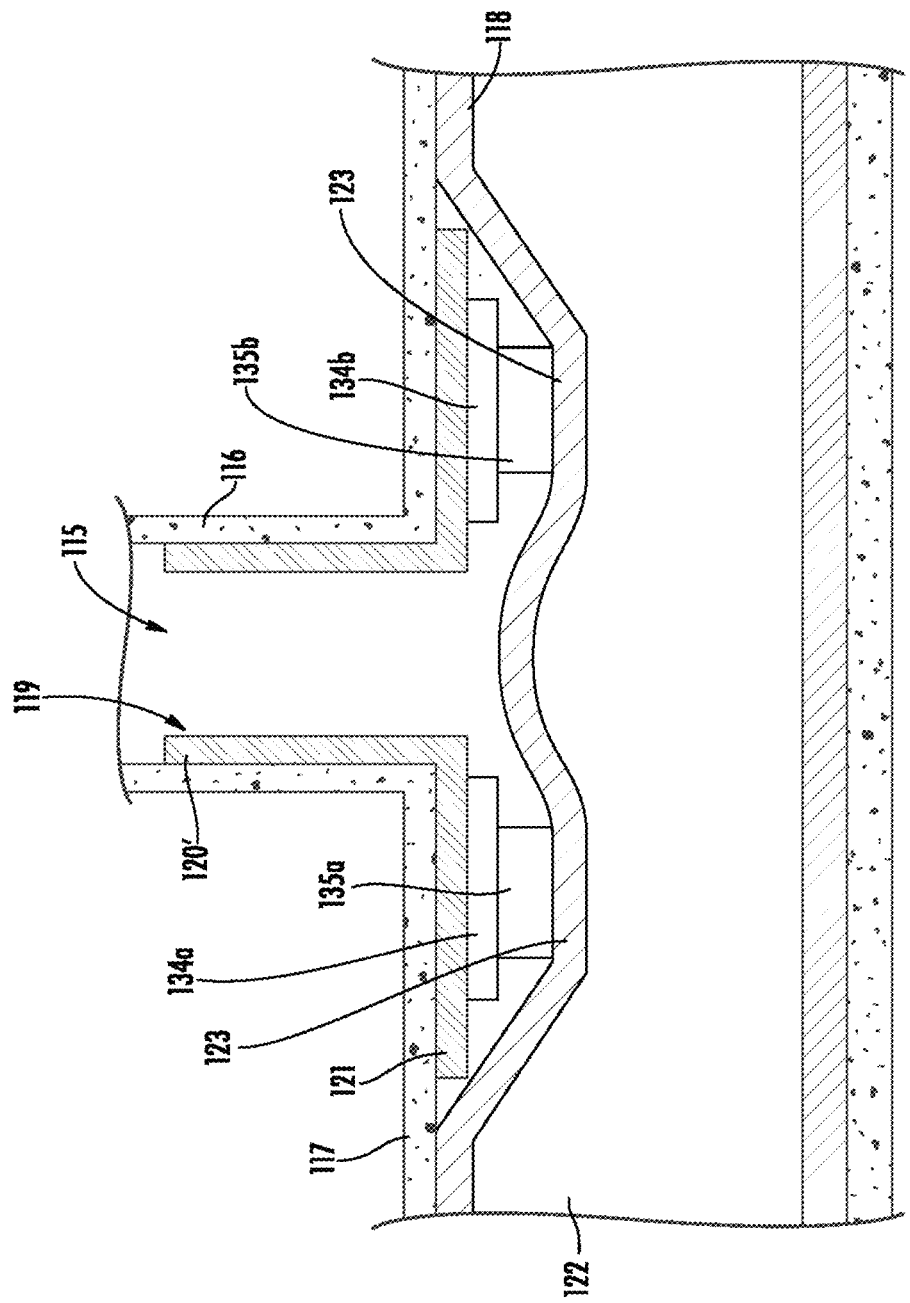
FIG. 7 is a schematic diagram of an underground pipe repair device, according to a fourth example embodiment.
Figure 8:
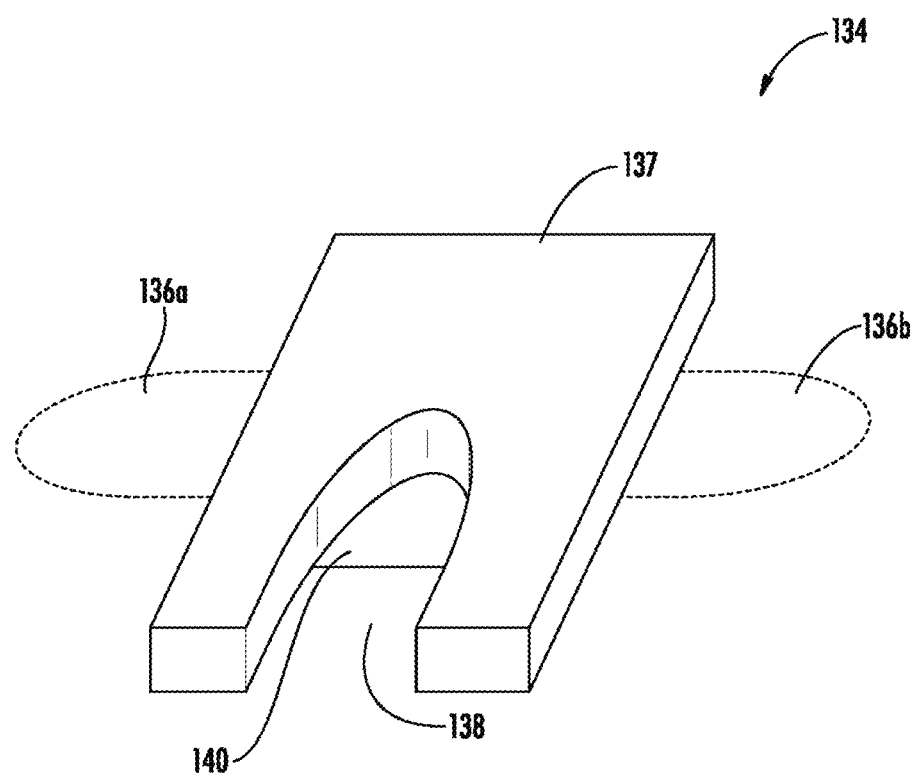
FIG. 8 is a schematic perspective view of a retention device from the underground pipe repair device, according to an example embodiment.
Figure 12:
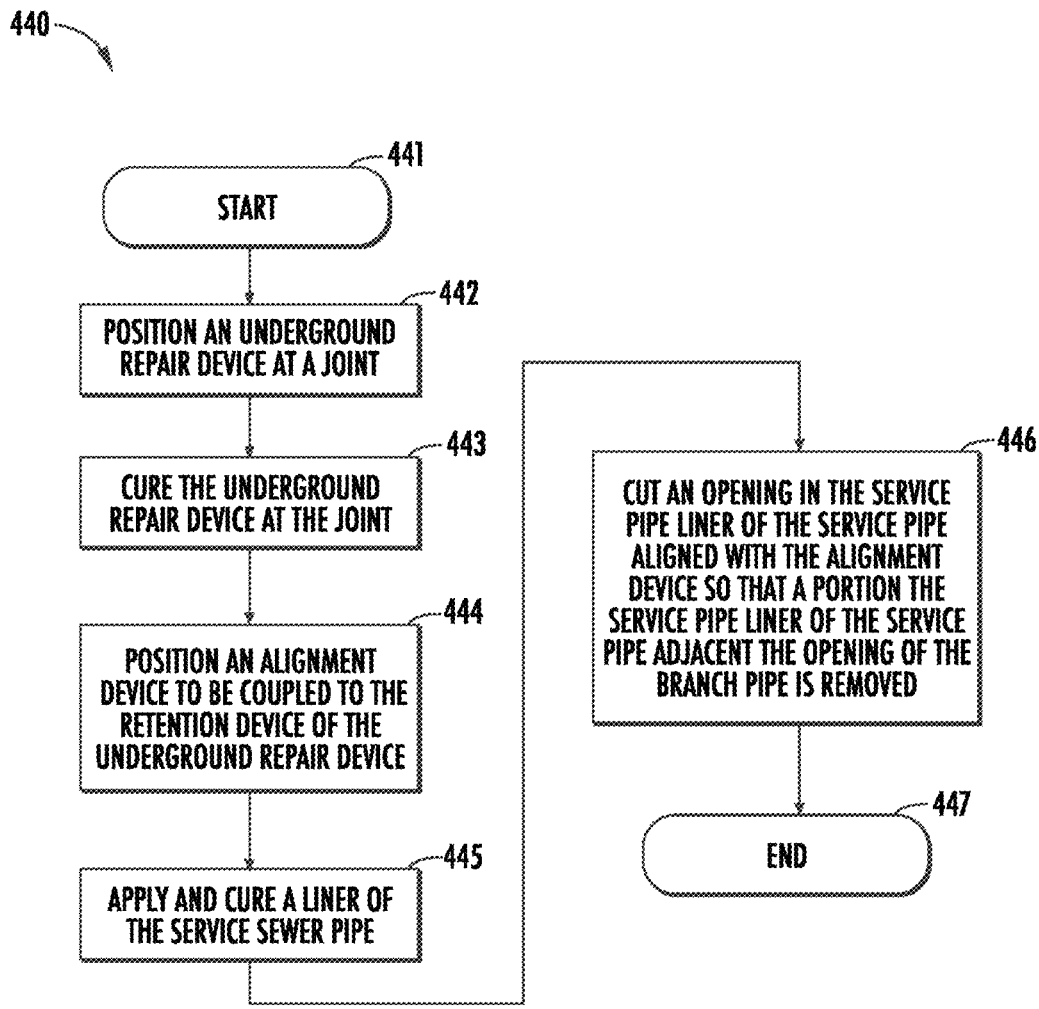
FIG. 12 is a flowchart illustrating a method for operating the underground pipe repair system of FIG. 1.

Referring now additionally to FIGS. 7-8 and 12, another embodiment of the underground pipe repair device 115 is now described. Also, with reference to a flowchart 440, a method for operating the underground pipe repair device 115 is also now described. (Block 441). In this embodiment of the underground pipe repair device 115, those elements already discussed above with respect to FIGS. 1-3 & 6 are incremented by 100 and most require no further discussion herein. This embodiment differs from the previous embodiment in that this underground pipe repair device 115 illustratively includes a T-shaped joint liner 119 having a base portion 121 extending laterally in the service pipe 117, and an arm portion 120 extending vertically into the branch pipe 116. The underground pipe repair device 115 illustratively includes a plurality of retention devices 134a-134b embedded in the base portion adjacent an opening in the branch pipe 116.

The underground pipe repair device 115 illustratively includes an alignment device 135a-135b to be coupled to the plurality of retention device 134a-134b, and a service pipe liner 118 extending in the service pipe 117 and under the T-shaped joint liner 119 and the alignment device. The alignment device 135a-135b extends vertically into the service pipe 117 so that the service pipe liner 118 has a radial bump 123 about the opening in the branch pipe 116.

As perhaps best seen in FIG. 8, each retention device 134a-134b illustratively includes an elongate body 137, and a plurality of tabs 136a-136b extending laterally from the elongate body. For example, in some embodiments, the plurality of tabs 136a-136b may be woven into the fabric of the base portion 121. The elongate body 137 defines a recess 138 therein, and illustratively includes a shelf portion 140 extending within the recess. The alignment device 135-135b may be at least partially received by the recess 138. The alignment device 135a-135b may comprise the annular spacers 25, 25' of the embodiments of FIGS. 2-3 or the first, second, and third annular spacers 30'"-32'" of the embodiment of FIG. 6.

As will be appreciated, a method for operating an underground pipe repair system for repairing a joint between the service pipe 117 and a branch pipe 116 is now described and uses the underground pipe repair device 115. The method illustratively includes positioning the underground pipe repair device 115 at the joint. (Block 442). The method may include curing the underground pipe repair device 115 to the joint. (Block 443). Once the underground pipe repair device 115 is cured to the joint, the method includes positioning an alignment device 135a-135b to be coupled to the plurality of retention devices 134a-134b. (Block 444).

In some embodiments, such as in FIG. 8, the alignment device 135a-135b would include a protruding portion (e.g. a hook for hanging on the shelf portion 140) for being inserted into the recess 138 of each retention device 134a-134b. In other embodiments, each retention device 134a-134b may comprise a hook and loop interface (i.e. the opposing interface being on the alignment device 135a-135b). In other embodiments, each retention device 134a-134b may comprise a grommet, eyelet, or magnetic device embedded in the base portion 121. Indeed, any coupling/physical interface device can be used so long as it can support the weight of the alignment device 135a-135b.

The method also illustratively includes applying and curing the service pipe liner 118 for the service pipe 117 (Block 445), and cutting an opening in the service pipe liner of the service pipe aligned with the alignment device 135a-135b so that a portion the service pipe liner of the service pipe adjacent the opening of the branch pipe 116 is removed. (Blocks 446-447).

Advantageously, in embodiments where the alignment device 135a-135b comprises the first, second, and third annular spacers 30'"-32'" of the embodiment of FIG. 6, the T-shaped joint liner 119 is completely cured to the joint before attachment of the alignment device. This can helpful in embodiments where one or both of second annular spacer 31'" and the third annular spacer 32'" comprise a swellable seal. In past approaches where the alignment device 135a-135b is integrated with the T-shaped joint liner 119, the swellable seals would prematurely absorb ambient water and expand. This would be before application of the service pipe liner 118, and since these swellable seals are intended to abut and swell up against this same service piper liner, this could lead to unwanted water intrusion after the relining. Positively, the alignment device 135a-135b is applied right before the application of the service pipe liner 118, assuring that the swellable seals expand against the service pipe liner.

Figure 9:
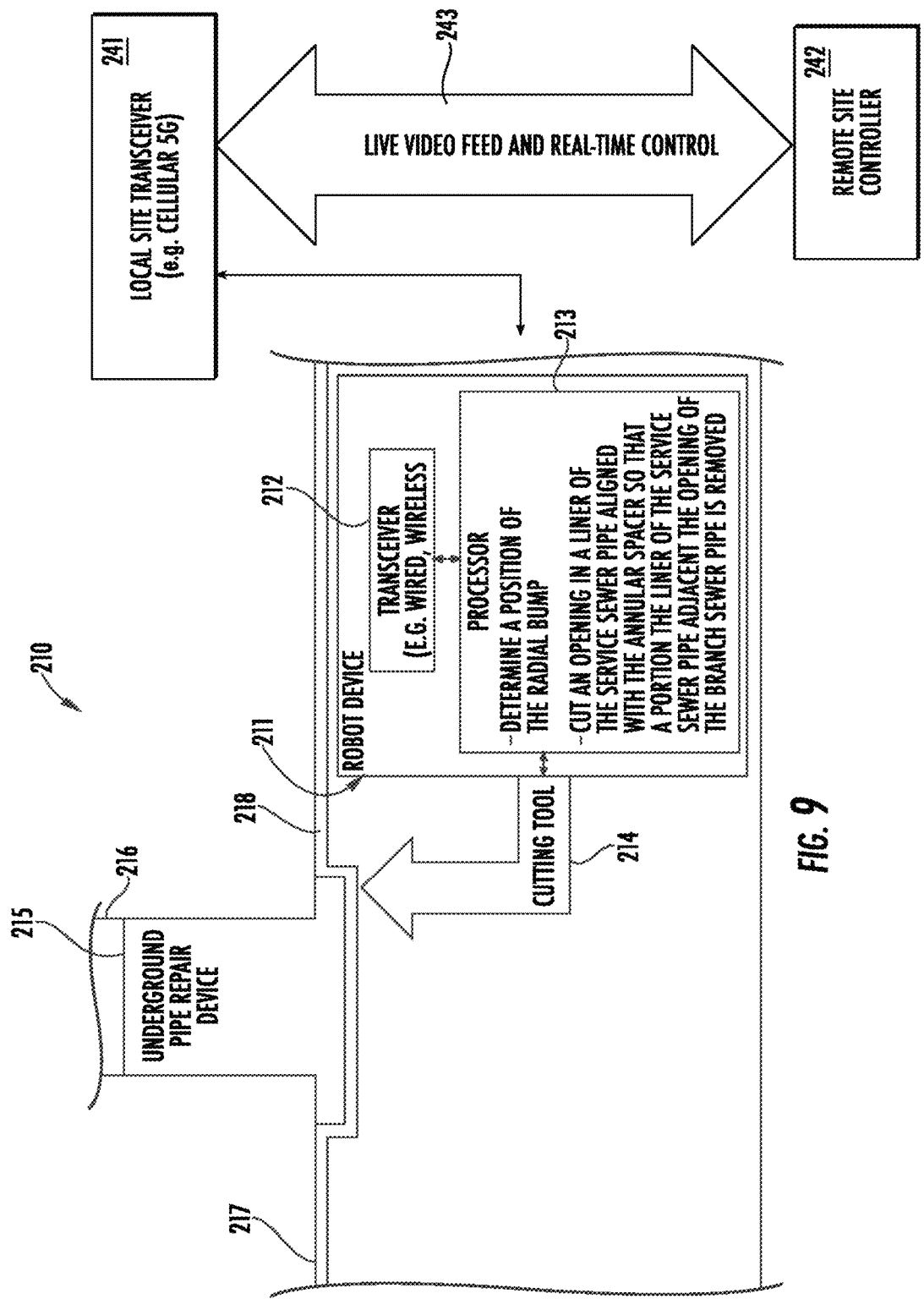
FIG. 9 is a schematic diagram of an underground pipe repair system, according to another example embodiment.

Referring now additionally to FIG. 9, another embodiment of the underground pipe repair system 210 is now described. In this embodiment of the underground pipe repair system 210, those elements already discussed above with respect to FIGS. 1-3 & 6, 7 are incremented by 100 and most require no further discussion herein. This embodiment differs from the previous embodiment in that this underground pipe repair system 210 illustratively includes a local site transceiver 241 in communication with the robot device 211. As will be appreciated, the local site transceiver 241 uses a wired or wireless connection to the transceiver 212 of the robot device 211. The local site transceiver 241 may comprise a large bandwidth (e.g. >50 Mbps), low latency (<1 ms) wireless transceiver, such as, for example, a 5th-Generation Wireless Systems (5G) technology that satisfies ITU IMT-2020 requirements and 3GPP Release 15, which is incorporated by reference in its entirety.

The underground pipe repair system 210 also illustratively includes a remote site controller 242 (e.g. spaced apart by several or more miles) in communication with the local site transceiver 241 over a real-time connection 243. Helpfully, a user at the remote site controller 242 can operate the robot device 211 remotely, or perhaps across long distances. The real-time connection 243 would provide a live video feed to the user at the remote site controller 242, and the user could manipulate the robot device 211 at one or more sites, leveraging the connection to reduce personnel costs.

In some embodiments (not shown), the local site transceiver 241 illustratively includes a location module (e.g. global positioning system (GPS) module) configured to generate location data for the underground pipe repair system 210, and a module configured to provide a relative position (e.g. number of meters down pipe and a directional element) of the robot device 211. The local site transceiver 241 may also include a wireless local area network (WLAN) base station (not shown) (e.g. IEEE 802.11x, Bluetooth, WiMAX, Zigbee IEEE 802.15.4). The WLAN base station is configured to permit regulatory officials a wireless interconnect with the underground pipe repair system 210. For example, an inspector may login the underground pipe repair system 210 and determine whether work is occurring in the appropriate permitted location.

Figure 10:
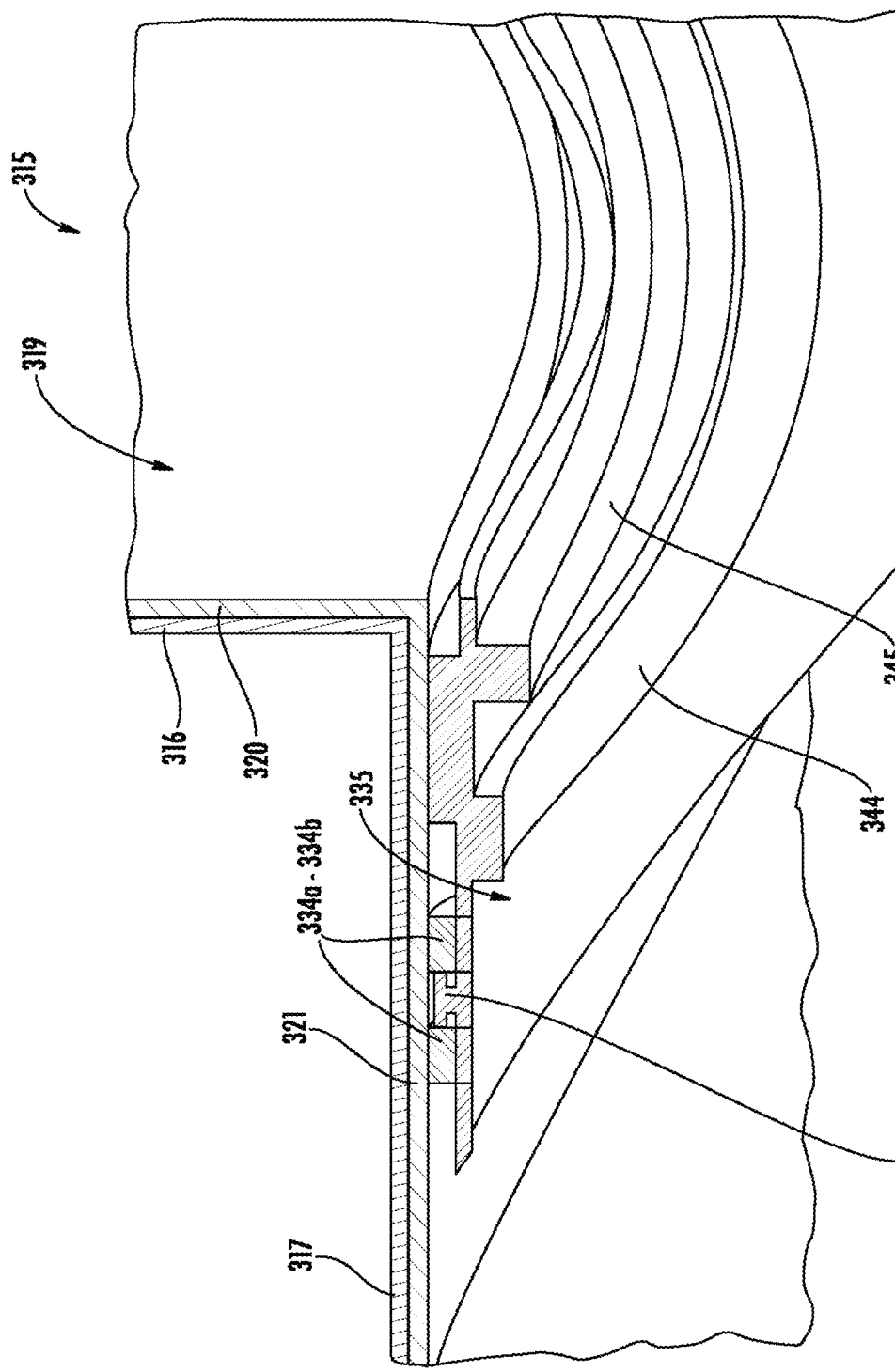
FIG. 10 is a schematic diagram of a portion of an underground pipe repair device, according to yet another example embodiment.
Figure 11:
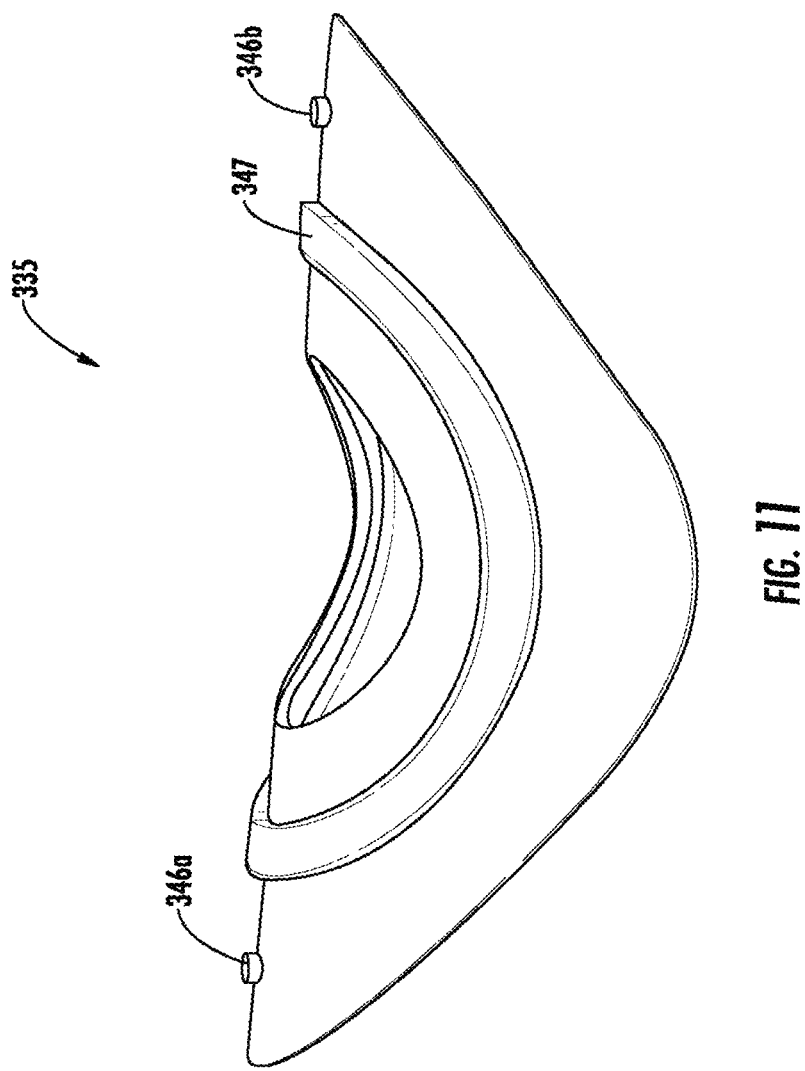
FIG. 11 is a schematic perspective view of the alignment device from the underground pipe repair device of FIG. 10.

Referring now additionally to FIGS. 10-11, another embodiment of the underground pipe repair device 315 is now described. In this embodiment of the underground pipe repair device 315, those elements already discussed above with respect to FIGS. 7-8 are incremented by 200 and most require no further discussion herein. This embodiment differs from the previous embodiment in that this underground pipe repair device 315 illustratively includes the retention device comprising a tongue and groove interface.

The underground pipe repair device 315 illustratively includes first and second annular rings 334a-334b defining a groove therebetween. The underground pipe repair device 315 illustratively includes an alignment device 335 to be coupled to the first and second annular rings 334a-334b.

The alignment device 335 illustratively includes a tongue portion 346 configured to interface (i.e. to fit into) with the groove. Here, the tongue portion 346 comprises a T-shaped tab structure, but other forms and shapes can be used. Also, the first and second annular rings 334a-334b may include radially inward protrusions to press and retain the tongue portion 346. That is, in these embodiments, the tongue portion 346 may snap fit into the groove. The alignment device 335 illustratively includes first and second annular spacers 344-345 of different height on an underside thereof for the robot device to find during the liner (not shown) cutting process. The alignment device 335 illustratively includes a third annular spacer 347 on the upper side thereof and configured to abut the base portion 321 of the T-shaped joint liner 319.

Figure 13:
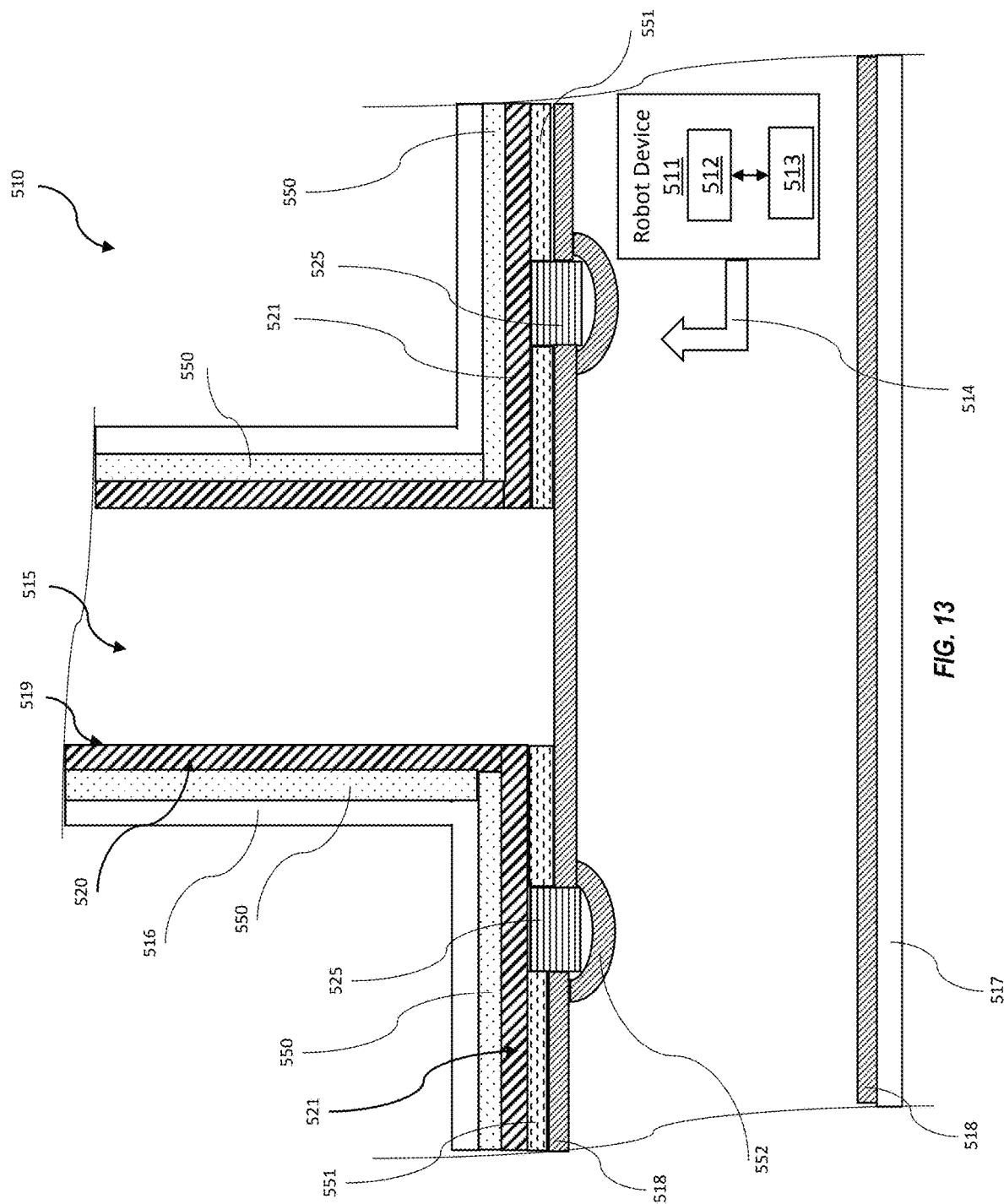
FIG. 13 is a schematic diagram of an underground pipe repair device, according to another example embodiment.

Referring now additionally to FIG. 13, another embodiment of the underground pipe repair system 510 is now described. In this embodiment of the underground pipe repair system 510, those elements already discussed above with respect to FIGS. 7-8 are incremented by 400 and most require no further discussion herein. The underground pipe repair system 510 is for repairing a joint between a service pipe 517 and a branch pipe 516. The underground pipe repair system includes an underground pipe repair device 515, and a robot device 511. The robot device 511 illustratively includes a transceiver 512, a cutting tool 514, and a processor 513 coupled to the transceiver and the cutting tool. The processor 513 is configured to cause the robot device 511 to move through the service pipe 517 and determine a position of the radial bump 522, and operate the cutting tool 514 to cut an opening in the service liner 518 of the service pipe aligned with the annular body 525 so that a portion the liner of the service pipe adjacent the opening of the branch pipe 516 is removed.

This embodiment differs from the previous embodiments in that this underground pipe repair device 515 illustratively includes a T-shaped joint liner 519 comprising a base portion 521 extending laterally in the service pipe 517, and an arm portion 520 extending vertically into the branch pipe 516. The base portion 521 illustratively includes a first base surface facing the service pipe, and a second base surface opposite the first base surface. The T-shaped joint liner 519 includes a swellable coating covering 550 the first base surface. The underground pipe repair device 515 illustratively comprises an annular body 525 aligned with an opening for the branch pipe 516 and coupled to the second base surface of the T-shaped joint liner 519.

The T-shaped joint liner 519 illustratively includes a flexible curable layer 551 abutting the second base surface. In other words, when the service liner 518 is cured, there is a strong mechanical bond to the T-shaped joint liner 519 since the two piece cure and couple together.

The arm portion 520 comprises a first arm surface facing the branch pipe 516, and a second arm surface opposite the first arm surface. The swellable coating 550 also illustratively covers the first arm surface. In some embodiments, the swellable coating 550 may cover an entirety of the first base surface and an entirety of the first arm surface. Advantageously, the swellable coating 550 prevent intrusion into the relined joint.

The annular body 525 extends vertically into the service pipe to provide the radial bump 552 about the opening of the branch pipe 516. The annular body 525 illustratively includes a rectangle-shaped cross section, but may comprise other shapes, such as a circle or oval cross section.

The annular body 525 may comprise portions, each portion having a different color. The annular body 525 may comprise a plastic material. The annular body 525 comprises a frangible material.

Yet another is directed to a method for operating an underground pipe repair system 510 for repairing a joint between a service pipe 517 and a branch pipe 516. The method includes positioning an underground pipe repair device 515 at the joint. The underground pipe repair device 515 also includes a T-shaped joint liner 519 comprising a base portion 521 extending laterally in the service pipe 517, and an arm portion 520 extending vertically into the branch pipe 516. The base portion 521 comprises a first base surface facing the service pipe 517, and a second base surface opposite the first base surface. The T-shaped joint liner 519 includes a swellable coating 550 covering the first base surface. The underground pipe repair device 515 also includes an annular body 525 aligned with an opening for the branch pipe 516 and coupled to the second base surface of the T-shaped joint liner. The method also includes curing the underground pipe repair device 515 to the joint, applying and curing a service liner 518 for the service pipe, and cutting an opening in the liner of the service pipe aligned with the annular body 525 so that a portion the liner of the service pipe adjacent the opening of the branch pipe 516 is removed.

Figure 14:
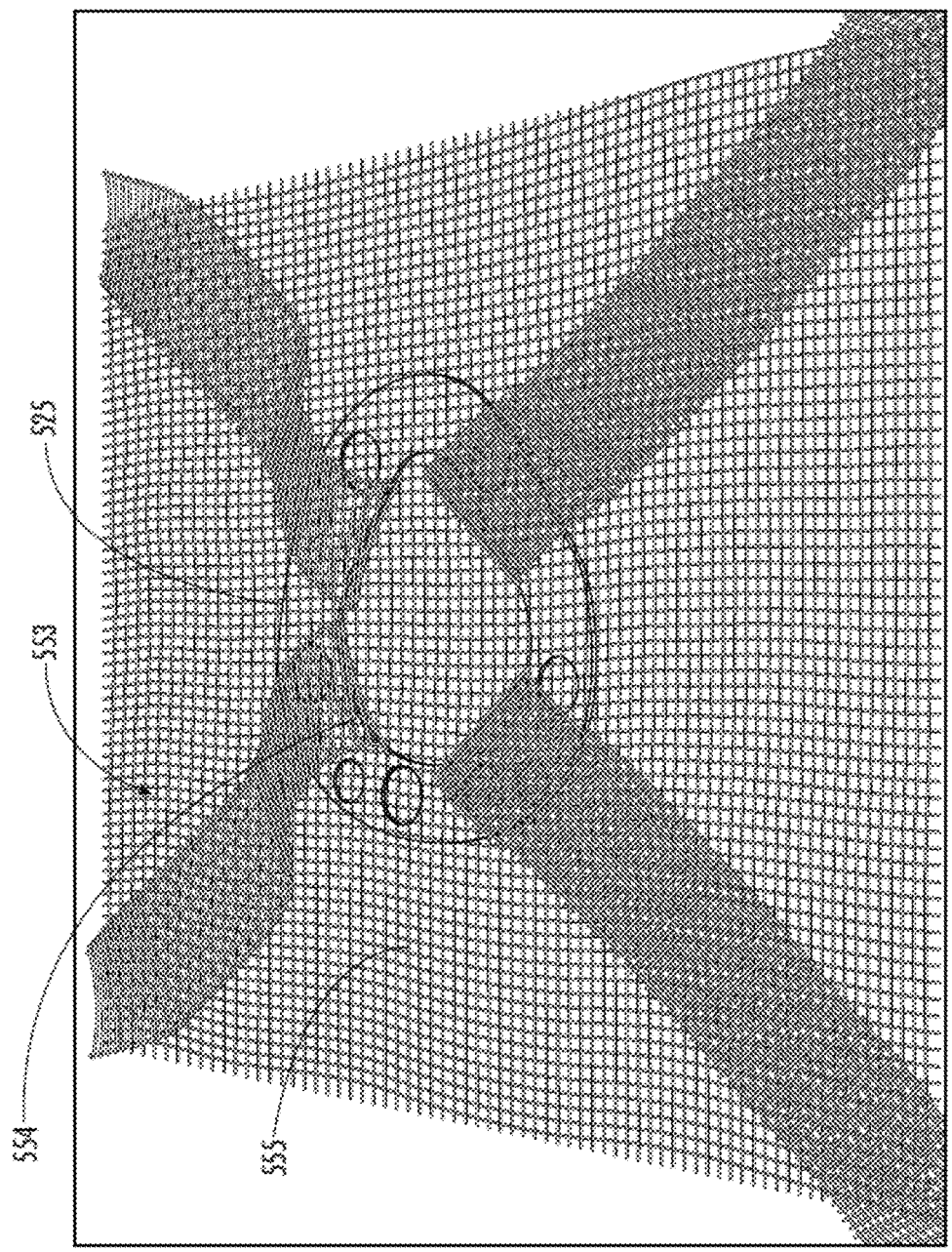
FIG. 14 is a schematic perspective view of an example embodiment of the annular body for the underground pipe repair device.

Referring now to FIG. 14, in some embodiments, the underground pipe repair device 515 comprises a scrim piece 553 coupled to the annular body 525. In particular, the scrim piece 553 comprises a medial portion 554 wrapped around the annular body 525, and an outer radial portion extending outward to define an anchoring portion 555 for coupling to the base portion 521. The scrim piece 553 effects a secure coupling of the annular body 525 to the second base surface, yet permits the service liner 518 to be cured onto the second base surface.

It should be appreciated that any feature from the prior embodiments of the underground pipe repair system 10, 210 or the underground pipe repair device 15, 15', 15''', 115, 315 may be incorporated in the underground pipe repair system 510.

Figure 15:
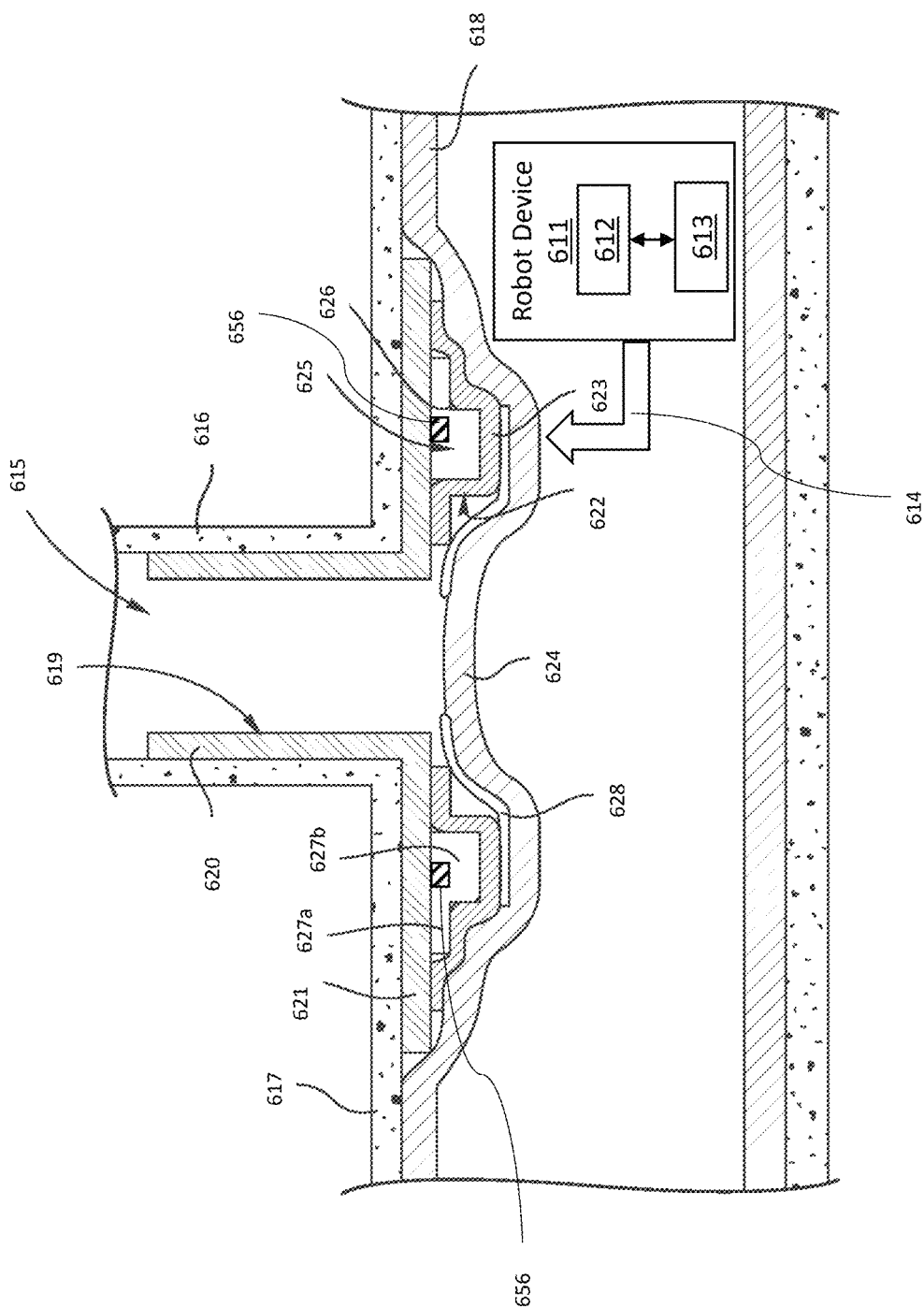
FIG. 15 is a schematic diagram of an underground pipe repair device, according to another example embodiment.
Figure 16:
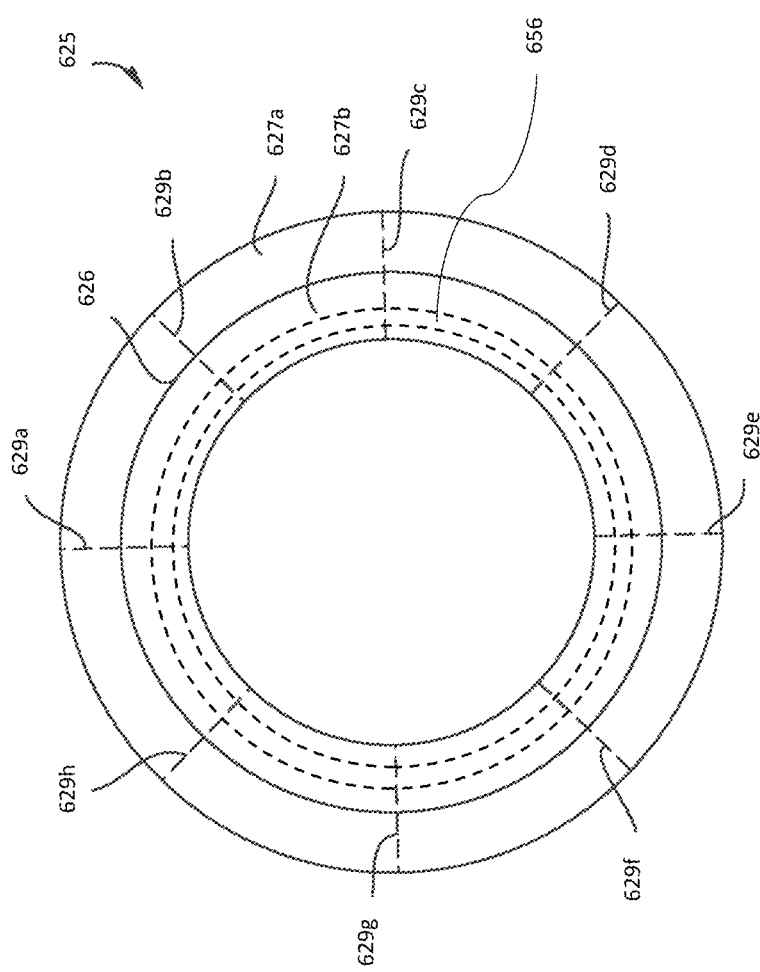
FIG. 16 is a schematic top plan view of the annular spacer from the underground pipe repair device of FIG. 15.

Referring now additionally to FIGS. 15-16, another embodiment of the underground pipe repair device 615 is now described. In this embodiment of the underground pipe repair device 615, those elements already discussed above with respect to FIGS. 2 & 5 are incremented by 600 and most require no further discussion herein. The underground pipe repair device 615 includes the annular body 625 having a magnetic material ring 656 therein. For example, the magnetic material ring 656 may comprise a ferromagnetic material, such as ferrite. In the illustrated embodiment, the magnetic material ring 656 is a continuous loop, but in other embodiments, the magnetic material ring 656 may comprise a plurality of magnetic pieces spaced apart in the annular body 625.

During cutting of the service liner 618, the robot device 611 is configured to detect the presence of the magnetic material ring 656 using an electromagnetic field generating device (e.g. an electromagnet) to apply an electromagnetic field to the magnetic material ring 656. In some embodiments, the annular body 625 may be flat and provide little or no visually appreciable radial bump, and the robot device 611 would rely only or primarily on the feedback from the electromagnetic field generating device to locate a cutting point. In some embodiments, the electromagnetic field generating device comprises an electromagnet, and the feedback comprises magnetic attraction.

In another embodiment, the annular body 625 comprises an RFID tag carried thereby. Here, the robot device 611 is configured to detect the RFID tag using an RF transmitter.

Figure 17:
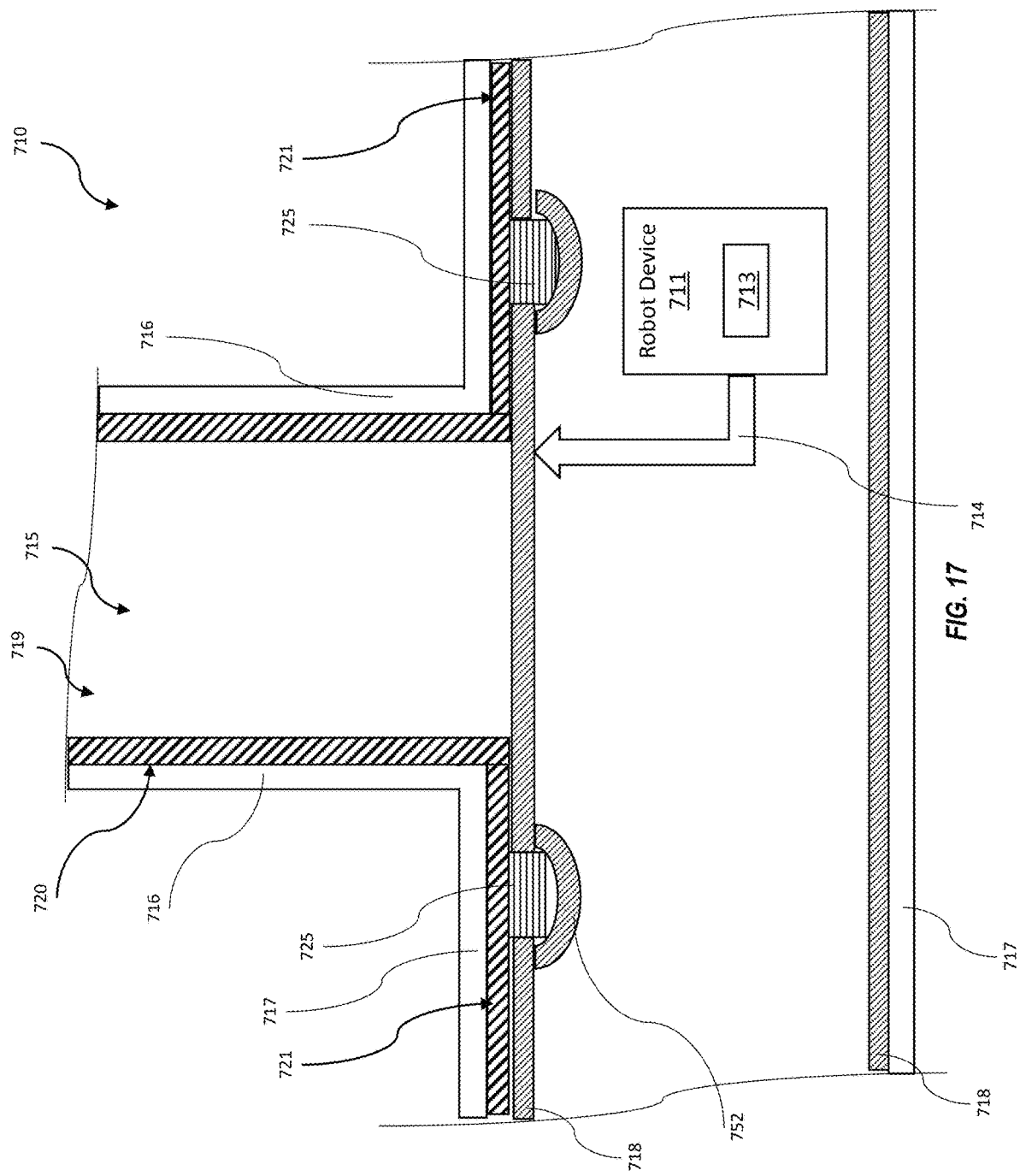
FIG. 17 is a schematic diagram of an underground pipe repair device, according to another example embodiment.

Referring now additionally to FIG. 17, another embodiment of the underground pipe repair system 710 is now described. In this embodiment of the underground pipe repair system 710, those elements already discussed above with respect to FIGS. 2 & 5 are incremented by 700 and most require no further discussion herein. The underground pipe repair system 710 is for repairing a joint between a service pipe 717 and a branch pipe 716. The underground pipe repair system 710 illustratively comprises an underground pipe repair device 715 comprising a T-shaped joint liner 719 comprising a base portion 721 extending laterally in the service pipe 717, and an arm portion 720 extending vertically into the branch pipe 716.

The base portion 721 illustratively comprises a first base surface facing the service pipe 717, and a second base surface opposite the first base surface (i.e. facing towards the interior of the service pipe 717). The underground pipe repair device 715 illustratively includes an annular body 725 aligned with an opening for the branch pipe 716 and coupled to the second base surface of the T-shaped joint liner 719. The annular body 725 includes a physical characteristic that can be detected.

The underground pipe repair system 710 illustratively includes a robot device 711 comprising a cutting tool 714, and a processor 713 coupled to the cutting tool. The processor 713 is configured to cause the robot device 711 to move through the service pipe 717 and determine a position of the annular body 725 based upon detecting the physical characteristic. The processor 713 is configured to operate the cutting tool 714 to cut an opening in a liner 718 of the service pipe 717 aligned with the annular body 725 so that a portion the liner of the service pipe adjacent the opening of the branch pipe 716 is removed.

In some embodiments, the physical characteristic may comprise a ferromagnetic characteristic, and the annular body 725 comprises a magnetic material. For example, the annular body 725 may comprise the magnetic material ring 656 of FIG. 16, or a plurality of spaced apart magnetic material pieces embedded therein.

In other embodiments, the physical characteristic may comprise an RFID tag (e.g. near field communications (NFC)) carried by the annular body 725. Here, the robot device 711 comprises an RF antenna to energize the passive RFID tag in the annular body 725. In yet other embodiments, the physical characteristic may comprise a known electrical potential. Here, the annular body 725 may be coupled to a reference voltage, and the known electrical potential may comprise the reference voltage (e.g. ground potential, 10 Volts DC). The robot device 711 comprises an electrical probe to run against an interior of the liner 718 of the service pipe 717 to detect the presence of the reference voltage.

Also, in some embodiments, the T-shaped joint liner 719 may comprise a flexible curable layer abutting the first base surface and the second base surface of the base portion 721, and the first arm surface of the arm portion 720. For example, this may be as depicted in the embodiment of FIG. 13.

Another aspect is directed to a method for operating an underground pipe repair system 710 for repairing a joint between a service pipe 717 and a branch pipe 716. The method includes positioning an underground pipe repair device 715 at the joint. The underground pipe repair device 715 includes a T-shaped joint liner 719 comprising a base portion 721 extending laterally in the service pipe 717, and an arm portion 720 extending vertically into the branch pipe 716. The base portion 721 comprises a first base surface facing the service pipe 717, and a second base surface opposite the first base surface. The underground pipe repair device 715 includes an annular body 725 aligned with an opening for the branch pipe 716 and coupled to the second base surface of the T-shaped joint liner 719, the annular body having a physical characteristic. The method includes curing the underground pipe repair device 715 to the joint, applying and curing a liner 718 for the service pipe 717, and determining a position of the annular body 725 based upon detecting the physical characteristic.

The method also includes cutting an opening in the liner 718 of the service pipe 717 aligned with the annular body 725 so that a portion the liner of the service pipe adjacent the opening of the branch pipe 716 is removed. In some embodiments, the robot device 711 may comprise a wireless transceiver configured to communicate with a remote control device. Here, the user would receive an indication that the annular body 725 was detected, and the user would manually operate the cutting tool 714.

In other embodiments, the entire cutting process is automated, and once the robot device 711 detects the annular body 725, the cutting tool 714 is automatically deployed to make the cut in the portion the liner 718 of the service pipe 717 adjacent the opening of the branch pipe 716. In these embodiments, the robot device 711 also includes a memory configured to store a mapping of the annular body 725. In particular, once any part of the annular body 725 is detected, the robot device 711 is configured to map the entirety of the annular body, and store this mapping in the memory. Subsequently, the robot device 711 is configured to operate the cutting tool 714 based upon the stored mapping.

In some embodiments, the annular body 725 comprises a frangible material. In yet other embodiments, the annular body 725 comprises a flat metallic ring, or a flat carbon ring. In these embodiments, the cutting tool 714 may comprise a water jet cutting tool. In some embodiments, the annular body 725 may be omitted. Here, the base portion 821 has physical characteristic to be detected.

Figure 18:
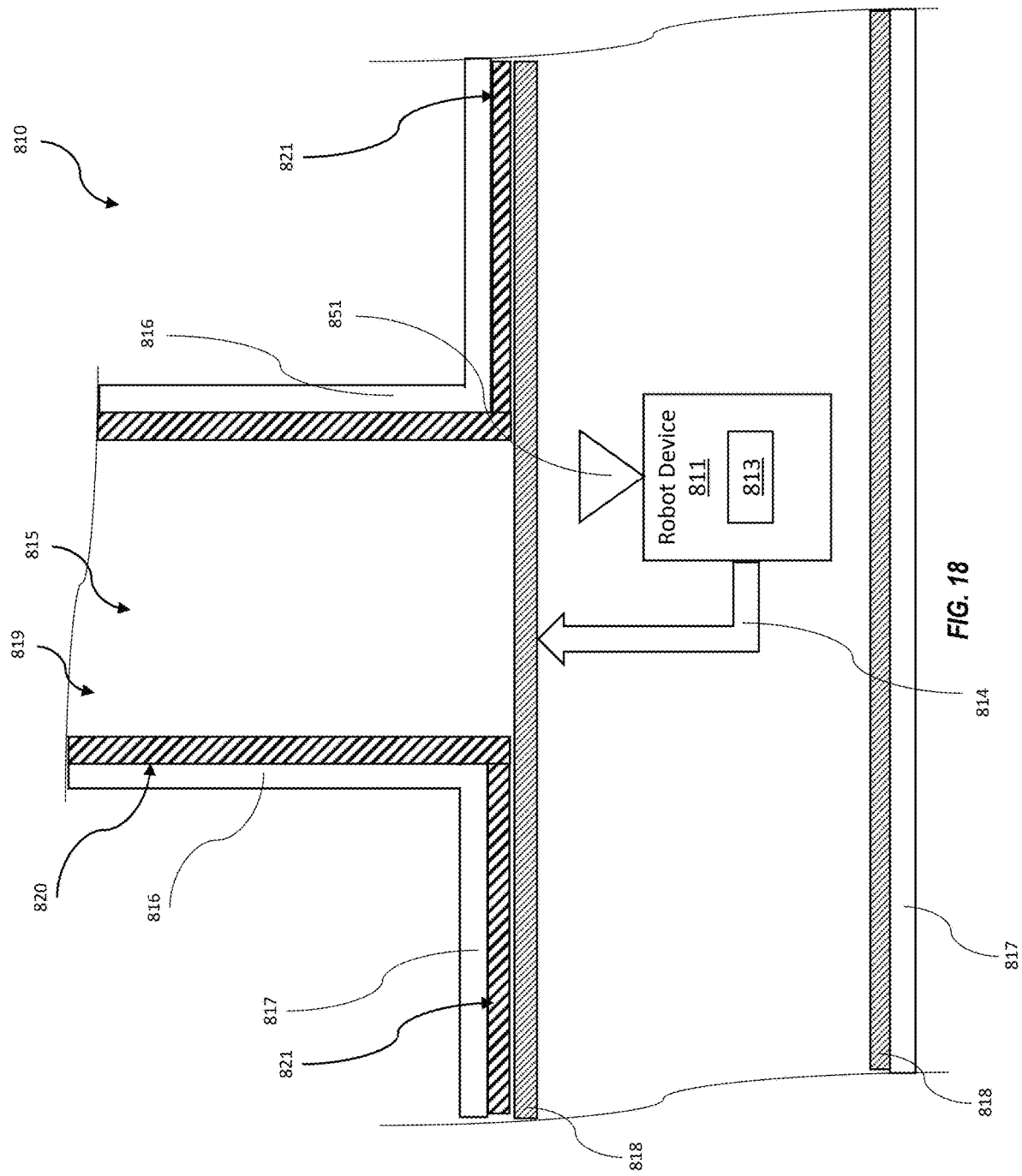
FIG. 18 is a schematic diagram of an underground pipe repair device, according to another example embodiment.

Referring now additionally to FIG. 18, another embodiment of the underground pipe repair system 810 is now described. In this embodiment of the underground pipe repair system 810, those elements already discussed above with respect to FIGS. 2 & 5 are incremented by 800 and most require no further discussion herein. The underground pipe repair system 810 is for repairing a joint between a service pipe 817 and a branch pipe 816. The underground pipe repair system 810 illustratively comprises an underground pipe repair device 815 comprising a T-shaped joint liner 819 comprising a base portion 821 extending laterally in the service pipe 817, and an arm portion 820 extending vertically into the branch pipe 816. In this embodiment, the annular body of the prior embodiments is omitted.

The underground pipe repair system 810 illustratively includes a robot device 811 comprising a cutting tool 814, a sensor 851, and a processor 813 coupled to the cutting tool and the sensor. The sensor 851 may comprise one or more of an image sensor, an infrared sensor, or an X-ray sensor.

The processor 813 is configured to cause the robot device 811 to move through the service pipe 817 and determine a position of the branch pipe 816 based upon an input from the sensor 851. In particular, the processor 813 is configured to detect when the backing of a liner 818 of the service pipe 817 is hollow. In some embodiments, the processor 813 is configured to implement a machine learning algorithm to detect a location of the underground pipe repair device 815. For example, the machine learning algorithm may be pre-trained using supervised learning techniques from prior user driven reinstatements.

When the underground pipe repair device 815 location has been determined, the processor 813 is configured to operate the cutting tool 814 to cut an opening in the liner 818 of the service pipe 817 aligned with the branch pipe 816 so that a portion the liner of the service pipe adjacent the opening of the branch pipe is removed. In particular, the cutting tool 814 first makes a puncture cut in the liner 818 of the service pipe 817 at the branch pipe 816, and subsequently uses a dremel cutting tool to cut radially outward to remove adjacent portions of the liner and to reinstate the branch pipe.

In some embodiments, the processor 813 is configured to store a known physical mapping of the underground pipe repair device 815 and map an actual position of the underground pipe repair device based upon the input from the sensor 851 and the stored physical mapping. For example, if the arm portion 820 of the underground pipe repair device 815 has a known diameter of 12 inches, the processor 813 is configured to cut an opening in the liner 818 of the service pipe 817 at the branch pipe 816, the opening having a diameter less than the known diameter of the arm portion 820.

In some embodiments, the arm portion 820 comprises a first arm surface facing the branch pipe 816, and a second arm surface opposite the first arm surface. The second arm surface may be mechanically hardened, for example, with a protective layer, from a lowermost point (i.e. at the meeting with the service pipe 817) and partially upward into the branch pipe 816. Here, the processor 813 is configured to rely less on the known mapping of the underground pipe repair device 815, but rather push the dremel cutting tool radially outward towards the mechanically hardened arm portion 820. Since the arm portion 820 is mechanically hardened, the dremel cutting tool does not damage the branch pipe 816 or the arm portion 820.

Figure 19:
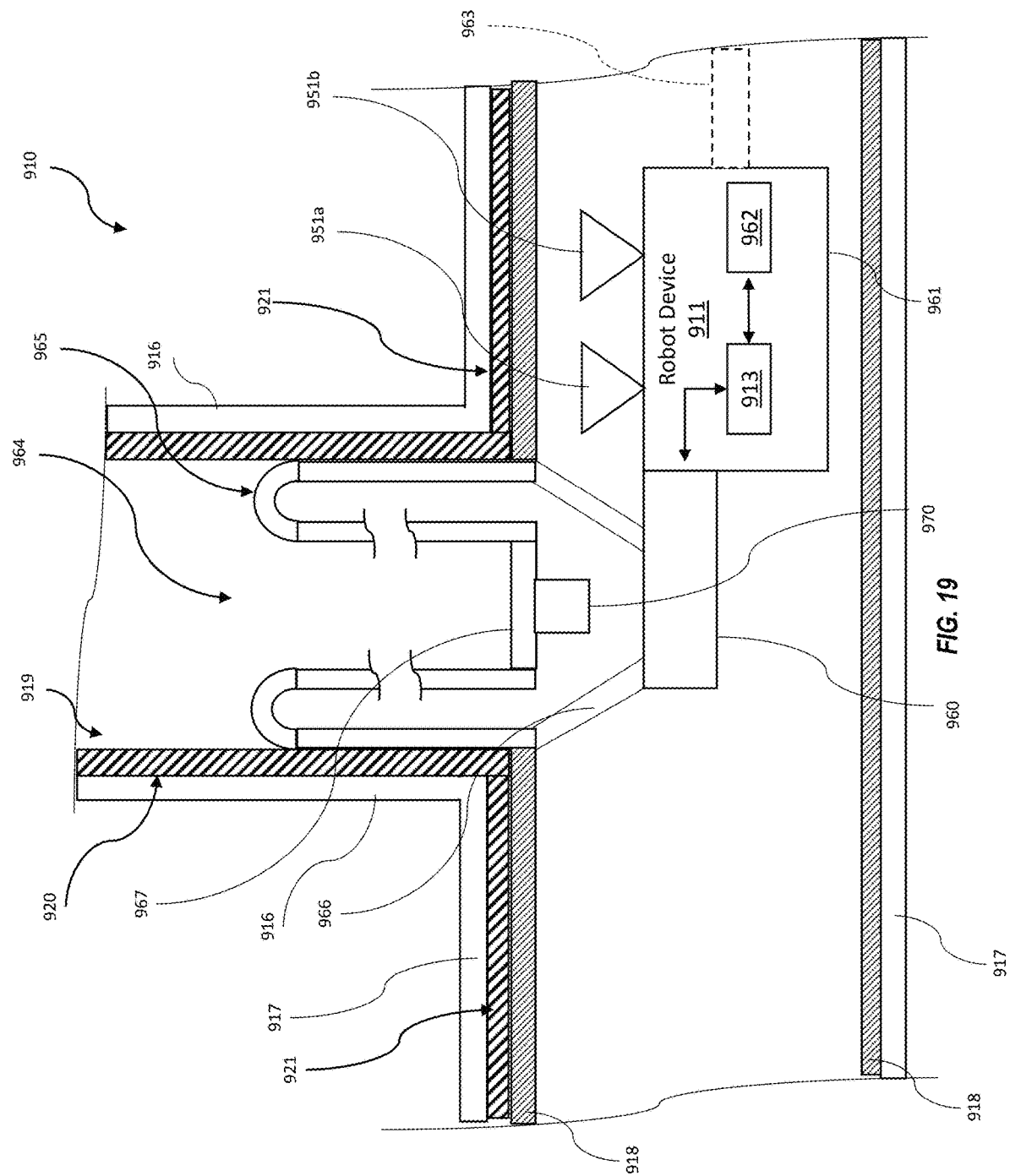
FIG. 19 is a schematic diagram of an underground pipe repair system with a liner assembly uninflated, according to another example embodiment.
Figure 20:
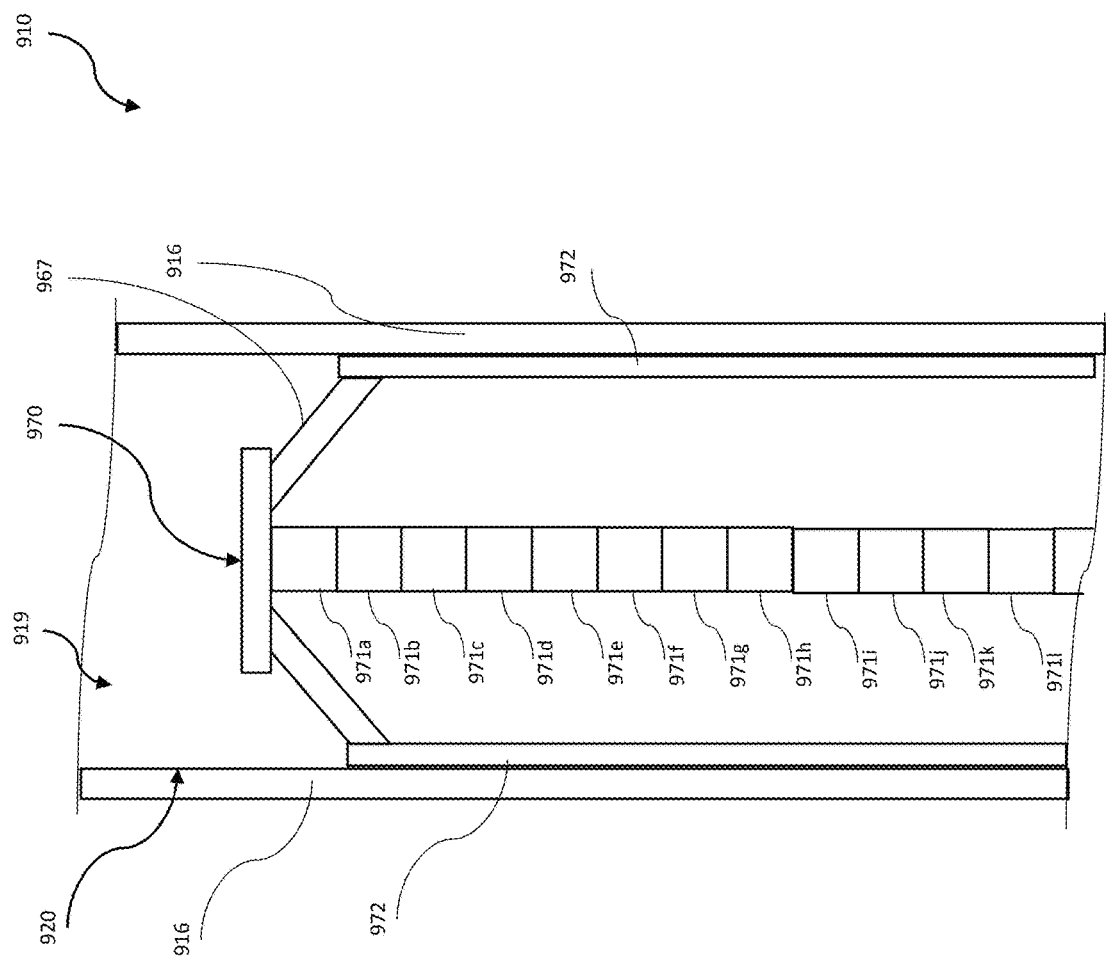
FIG. 20 is a schematic diagram of the underground pipe repair system of FIG. 19 with the liner assembly inflated.
Figure 21:
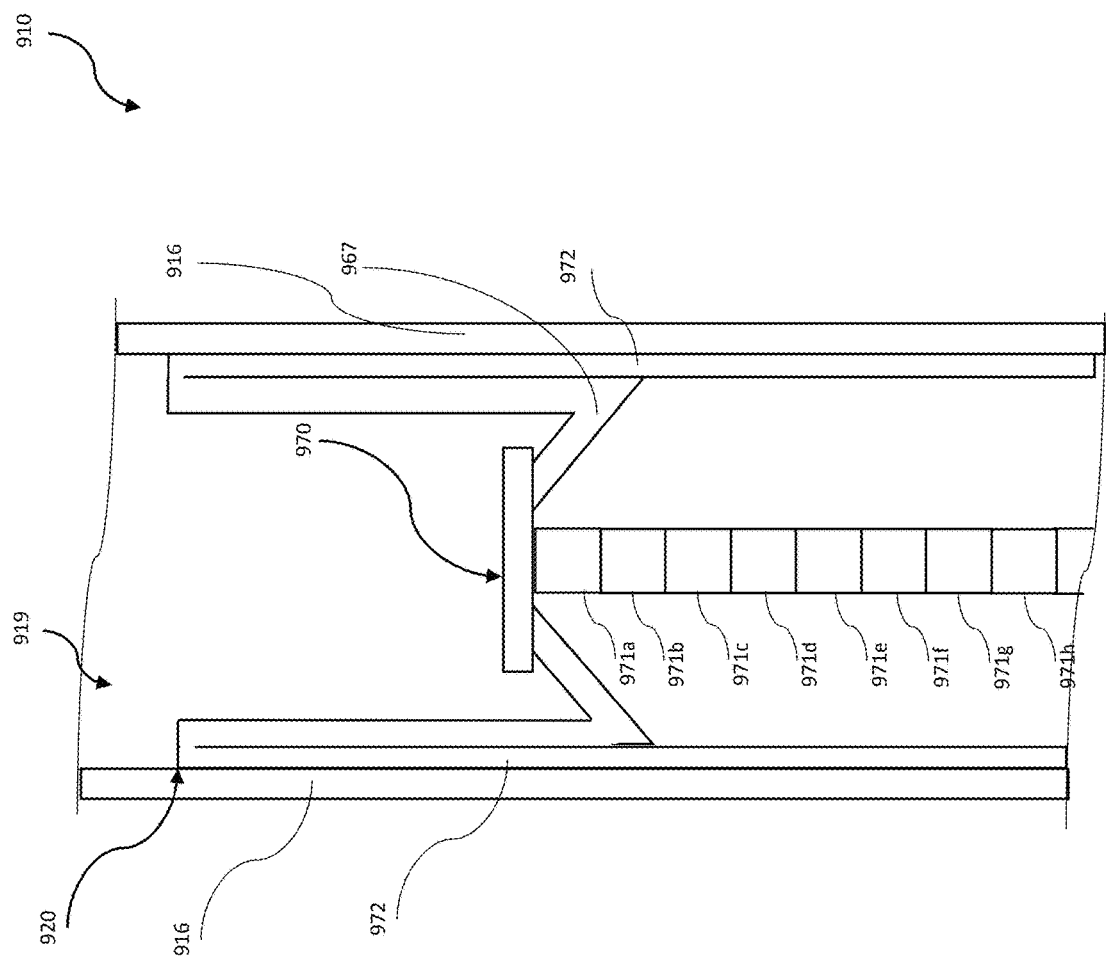
FIG. 21 is a schematic diagram of the underground pipe repair system of FIG. 19 with the liner assembly partially inflated.

Referring now additionally to FIGS. 19-21, another embodiment of the underground pipe repair system 910 is now described. In this embodiment of the underground pipe repair system 910, those elements already discussed above with respect to FIGS. 2 & 5 are incremented by 900 and most require no further discussion herein.

The underground pipe repair system 910 is for a branch pipe 916 connecting with a service pipe 917. In the illustrated embodiment, the underground pipe repair system 910 illustratively includes a T-shaped joint liner 919 and a liner 918 of the service pipe 917, but it should be appreciated that this T-shaped joint liner 919 can be omitted. In other words, the illustrated example, with the joint/service pipe liner omitted, the underground pipe repair system 910 would only perform a relining of the branch pipe 916.

Also similarly, it should be appreciated that this underground pipe repair system 910 can be used to repair any underground pipe, such as the service pipe 917, for example, and also in any application, such as sewer, water, gas, etc. In particular, the underground pipe repair system 910 may be used to reline the service pipe 917, for example, and in fact can be used to reline any pipe.

The underground pipe repair system 910 includes a robot device 911 within the service pipe 917. The robot device 911 illustratively includes an inflation tool 960, a plurality of sensor devices 951a-951b, a processor 913 coupled to the inflation tool and the sensor device, and a housing 961 carrying the inflation tool, the processor, and the sensor device. In some embodiments, the inflation tool 960 is only carried by the housing 961 and controlled independently of the processor 913. In yet other embodiments, the inflation tool 960 is separate from the robot device 911. In particular, the plurality of sensor devices 951a-951b may comprise an image sensor, a proximity sensor, or a magnetic field detector, for example. Indeed, any sensor type useful for navigating underground could be used.

The robot device 911 illustratively includes a battery power supply 962 carried by the housing 961 and coupled to the processor 913, the plurality of sensor devices 951a-951b, and the inflation tool 960. Of course, the battery power supply 962 may alternatively comprise any portable power source (e.g. charged capacitors). It should be appreciated that the battery power supply 962 powers other components on the robot device 911, such as the cutting tool, packers and the sensor devices. In some embodiments, the battery power supply 962 may alternatively comprise a power generator, carried by the robot device 911. For example, the power generator may comprise a power generator operating from ambient humidity using protein nanowires, or a geothermal power generation device. Advantageously, the illustrated embodiment may avoid the need for an external power source located at the surface. Indeed, as will be appreciated, in typical approaches, the power source may comprise a special purpose vehicle with a high power internal combustion generator. These vehicles may be expensive to manufacture, and necessitate long copper power transmission lines, which are expensive. More so, the long run underground may create power transmission loss concerns.

In other embodiments, the battery power supply 962 may be omitted and the robot device 911 comprises a power cable 963 (shown with dashed lines) extending to a surface for power. The power cable 963 may transmit a direct current (DC) power supply or an alternating current (AC) power supply. In some embodiments, the components carried by the robot device 911 operate based upon DC power, and AC line embodiments will require an AC-DC converter onboard the robot device.

The underground pipe repair system 910 illustratively includes a liner assembly 964 comprising an inverted liner 965 comprising a proximal end 966 coupled to the inflation tool 960, and a distal end 967 opposite the proximal end. In some embodiments, the inflation tool 960 comprises a positive pressure source, for example, an air pump.

In the illustrated embodiment, the inflation tool 960 directly inflates the inverted liner 965. In other embodiments, the liner assembly 964 would include an inflation bladder within the inverted liner 965, and the inflation tool 960 is configured to inflate the inflation bladder, which in turn positions the inverted liner.

The liner assembly 964 illustratively comprises an electronic curing device 970 coupled to the distal end 967 and within the inverted liner 965 and coupled to the processor 913. The electronic curing device 970 illustratively includes a plurality of linked UV light sources 971a-9711, for example, a chain of linked LED UV light sources. In other embodiments, the electronic curing device 970 may comprise other radiation type curing devices, such as a heat/infrared radiation curing device. In yet other embodiments, the electronic curing device 970 comprises an electronic chemical curing device. For example, the electronic chemical curing device may comprise one or more nozzles, and a pressurized curing fluid source coupled to the one or more nozzles. As the inverted liner 965 is inverted into place, the electronic chemical curing device would apply curing fluid as it is drawn through the branch pipe 916. Of course, in some embodiments, the liner may be pulled in place without inversion.

The processor 913 is configured to cause the robot device 911 to move through the service pipe 917, and determine a position of the branch pipe 916. In particular, the processor 913 cooperates with the plurality of sensor devices 951a-951b to determine a position of the joint between the branch pipe 916 and the service pipe 917.

The processor 913 is configured to operate the inflation tool 960 to invert and cause the inverted liner 965 to inflate within the branch pipe 916 and position the electronic curing device 970 within the inflated liner 972 (no longer inverted). More specifically, as shown in FIG. 21 in partially inflated state, in this illustrated embodiment, the electronic curing device 970 is dragged through the branch pipe 916 via the inflation process. Once the inverted liner 965 is fully inflated (FIG. 20), the processor 913 is configured to activate the electronic curing device 970 to cure the inflated liner 972 within the branch pipe 916.

In other embodiments, the processor 913 is not coupled to nor controls the electronic curing device 970. In these embodiments, the electronic curing device 970 comprises control circuitry that selectively activates the plurality of linked UV light sources 971a-9711. In an advantageous embodiment, the control circuitry comprises a sensor configured to detect an internal pressure of the inflated liner 972. When the internal pressure of the inflated liner 972 exceeds a threshold value, the control circuitry is configured to activate the electronic curing device 970 to cure the inflated liner 972 within the branch pipe 916. The control circuitry may comprise, for example, a pressure switch, or a pressure switch electrically coupled to a relay switch. The control circuitry may be carried internally within the inflated liner 972, carried with a pressure line feeding the inflation tool 960, or within the housing 961, such as within the battery casing.

In particular, when the control circuitry is carried by the housing 961, the control circuitry may comprise a pressure sensor configured to detect when the internal pressure of the inflated liner 972 exceeds the threshold value, and relay switch electrically coupled to and controlled by the pressure sensor. The relay switch would control energizing of the inflation tool 960.

In yet other embodiments, the control circuitry may comprise a timer circuit. The timer circuit is configured to monitor for expiration of a set time period after activation of the inflation tool 960, and after expiration of the set time period, activate the electronic curing device 970 to cure the inflated liner 972 within the branch pipe 916. Indeed, the control circuitry may comprise any device configured to detect the inflation state of this inflated liner 972.

With the control circuitry, the activation of the electronic curing device 970 can be performed partially autonomously and without surface control. In other embodiments, the user may control activation of the electronic curing device 970 via a remote control (either wired or wireless remote control of the robot device 911).

In the illustrated embodiment, the robot device 911 carries the inflation tool 960, the electronic curing device 970, and the battery power supply 962. The battery power supply 962 powers all onboard devices, including the inflation tool 960, the electronic curing device 970, the processor 913, cutting devices, packers, and the plurality of sensor devices 951a-951b, etc. Again, this may obviate the need for a separate surface power supply.

Another aspect is directed to a method for operating an underground pipe repair system 910 for repairing a branch pipe 916 connecting with a service pipe 917. The underground pipe repair system 910 includes a robot device 911 comprising an inflation tool 960, and a housing 961 carrying the inflation tool. The underground pipe repair system 910 also includes a liner assembly 964 comprising an inverted liner 965 comprising a proximal end 966 coupled to the inflation tool 960, and a distal end 967 opposite the proximal end, and an electronic curing device 970 coupled to the distal end and within the inverted liner. The method includes operating the processor 913 to cause the robot device 911 to move through the service pipe 917, determine a position of the branch pipe 916, operate the inflation tool 960 to invert and cause the inverted liner 965 to inflate within the branch pipe and position the electronic curing device 970 within the inflated liner, and activate the electronic curing device to cure the inflated liner within the branch pipe.

In the illustrated embodiment, the electronic curing device 970 is coupled to the inverted liner 965 and dragged along during the inversion process. In another embodiment, the inverted liner 965 is inflated in place within the branch pipe 916, and the electronic curing device 970 is subsequently positioned in place.

In the illustrated embodiment, the electronic curing device 970 is coupled to the inverted liner 965 and dragged along during the inversion process. In another embodiment, the inversion of the liner 965 is omitted. In particular, for this embodiment, the non-inverted liner and the electronic curing device 970 within it are dragged (or pulled) into the branch pipe 916 by the robot device 911.

In another embodiment, the electronic curing device 970 is positioned after the inverted liner 965 is fully inflated or pressurized and within the branch pipe 916. Here, the robot device 911 positions the electronic curing device 970 after inflation with another tool or using another robot.

In some embodiments, before application of any liner, one or more of the joint between the service pipe 917 and the branch pipe 916, some or all of the service pipe, and some or all of the branch pipe may be coated with at least layer of material. The at least layer of material comprises, for example, a preliner material, or a water proofing adhesive material layer. The at least one layer may be cured using the same electronic curing device 970 or be cured via a separate curing process, which may occur after or before application of the inverted liner. Regardless, the curing of the at least one layer may comprise a radiation (e.g. UV, IR (heat)) based curing or a chemical based curing. In these preliner embodiments, the base pipe may need to be prepared before application, such as a cleaning step and scarifying the base pipe. The application may be performed via a spray-on process from a nozzle, for example. Alternatively, the application may be performed by one or more rollers contacting the base pipe. Of course, these methods are merely exemplary in nature, and other application types are envisioned.

In another embodiment, for example, the at least one layer of material may be applied to inner and outer surfaces of a carrier membrane, which would be subsequently inverted/inflated or dragged into the base pipe. The membrane inversion may occur before or after the application of the inverted liner 965. The carrier membrane comprises a carrier layer (e.g. adhesive layer) for attaching to the pipe. The at least one layer is carried by the carrier layer.

The at least layer of material may comprise a curable water resistant material, for example, a UV curable water resistant layer. Indeed, when applied before the liner, the liner and any overlying layers need to be at least partially transparent to UV radiation to permit the at least layer of material to be cured simultaneously with the liner (i.e. for co-curing embodiments). Generally, the method includes applying a layer of curable material to the base pipe before relining.

Moreover, in other embodiments, the at least layer of material may be applied after application of the liner. Rather than being a preliner, this would serve as a protective over layer on the liner. As will be appreciated, the at least layer of material may fortify joints openings, which is helpful in gas, water lines, for example, which deal with greater pressure.

In yet another embodiment, the at least one layer is applied to the inverted liner 965 before inversion. Once the inverted liner 965 is inverted, the at least one layer is abutting the pipe. Again, the at least one layer may be cured with the inverted liner 965 or separately.

In another embodiment, a carrier membrane layer is covered with the at least one layer. The carrier membrane layer is then applied to the pipe base before application of the new liner or the T-shaped joint liner 919. In another embodiment, the carrier membrane layer is applied subsequent to the relining or application of the T-shaped joint liner 919. In other words, the carrier membrane layer is attached to the new liner at points of potential failure to provide additional protection.

In another embodiment, the method comprises first positioning the T-shaped joint liner 919 at the connection of the branch pipe 916 and the service pipe 917, and curing the T-shaped joint liner. As will be appreciated, the T-shaped joint liner 919 would include one or more of the features (i.e. related to position detection, for example) in the embodiments described hereinabove. The subsequent steps may be formed some time thereafter, for example, as long as several months or years later. The method includes operating the processor 913 to cause the robot device 911 to move through the service pipe 917, determine a position of the now cured T-shaped joint liner 919 at the branch pipe 916, operate the inflation tool 960 to invert and cause the inverted liner 965 to inflate within the branch pipe and position the electronic curing device 970 within the inflated liner, and activate the electronic curing device to cure the inflated liner within the branch pipe.

Figure 22:
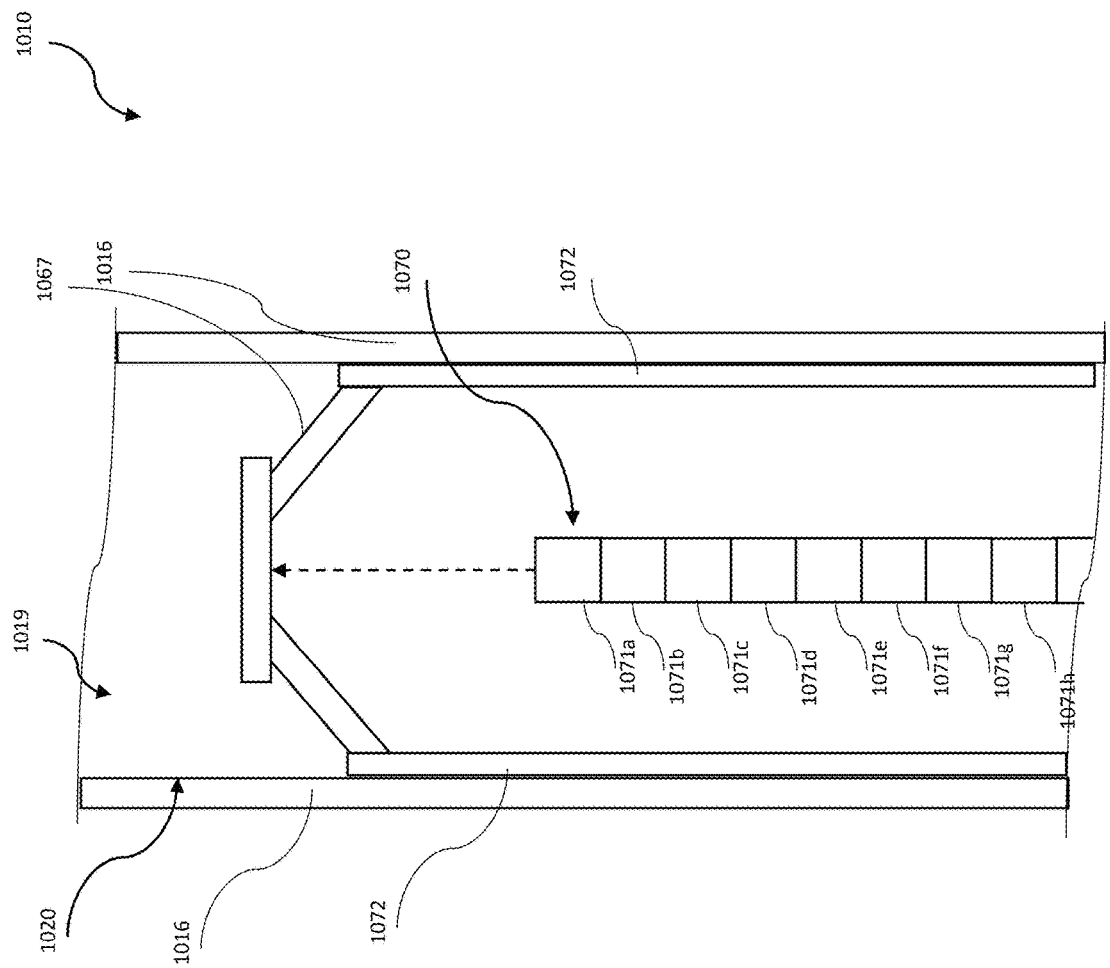
FIG. 22 is a schematic diagram of an underground pipe repair system with a liner assembly uninflated, according to another example embodiment.

Referring now additionally to FIG. 22, another embodiment of the underground pipe repair system 1010 is now described. In this embodiment of the underground pipe repair system 1010, those elements already discussed above with respect to FIGS. 2 & 5 are incremented by 1000 and most require no further discussion herein. In this underground pipe repair system 1010, the curing step is performed sequentially. In other words, the inflated liner 1072 is cured in stages. For example, as shown in FIG. 22, the inflated liner 1072 may be inflated fully the electronic curing device 1070 would be positioned to cure the first proximal portion of the inflated liner, then subsequently, the electronic curing device 1070 would be positioned to cure the remaining distal portion of the liner. The electronic curing device 1070 may be positioned via the use of a separate robot navigating the branch pipe 1016, or the electronic curing device may be winched in place.

It should be appreciated that features and elements of the disclosed embodiments of the underground pipe repair system 10, 110, 210, 510, 710, 910, 1010 may be combined with each other.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An underground pipe repair system for a pipe, the underground pipe repair system comprising:
 a robot device comprising
  a plurality of sensors,
  a processor coupled to the plurality of sensors, an on-board power supply coupled to the plurality of sensors and the processor, and a housing carrying the plurality of sensors, the processor, and the on-board power supply; and a liner assembly comprising a liner, the liner comprising
a proximal end directly coupled to an inflation tool, and
a distal end opposite the proximal end and to be positioned in at least one of the pipe and another pipe;

the processor configured to
cause the robot device to move through the second pipe,
cause the inflation tool to inflate the liner within the at least one of the pipe and another pipe, and
activate an electronic curing device to be positioned within the inflated liner to cure the inflated liner within the at least one of the pipe and another pipe.

2. The underground pipe repair system of claim 1 wherein the liner comprises an inverted liner to be inverted within the at least one of the pipe and another pipe by the inflation tool; wherein the liner assembly comprises the electronic curing device coupled to the distal end and within the liner; and wherein the electronic curing device is dragged within the inverted liner during inflation.

3. The underground pipe repair system of claim 2 wherein the processor is configured to activate the electronic curing device based upon detection of inflation of the inverted liner.

4. The underground pipe repair system of claim 2 wherein the processor is configured to activate the electronic curing device based upon internal pressure with the inflated liner exceeding a threshold pressure.

5. The underground pipe repair system of claim 2 wherein the processor is configured to activate the electronic curing device based upon a timer expiring.

6. The underground pipe repair system of claim 1 wherein the electronic curing device is positioned within the liner after inflation.

7. The underground pipe repair system of claim 1 wherein the robot device is powered without surface based power.

8. The underground pipe repair system of claim 1 wherein the electronic curing device comprises an ultraviolet (UV) radiation curing device.

9. An underground pipe repair system for a pipe, the underground pipe repair system comprising:
a robot device comprising
a plurality of sensors,
a processor coupled to the plurality of sensors,
an on-board power supply coupled to the plurality of sensors and the processor, the robot device being powered without surface based power, and
a housing carrying the plurality of sensors, the processor, and the on-board power supply; and
a liner assembly comprising a liner, the liner comprising
a proximal end directly coupled to an inflation tool, and
a distal end opposite the proximal end and to be positioned in at least one of the pipe and another pipe;
the processor configured to
cause the robot device to move through the pipe,
cause the inflation tool to inflate the liner within the at least one of the pipe and another pipe, and
activate an ultraviolet (UV) radiation curing device to be positioned within the inflated liner to cure the inflated liner within the at least one of the pipe and another pipe.

10. The underground pipe repair system of claim 9 wherein the liner comprises an inverted liner to be inverted within the at least one of the pipe and another pipe by the inflation tool; wherein the liner assembly comprises the UV radiation curing device coupled to the distal end and within the liner; and wherein the UV radiation curing device is dragged within the inverted liner during inflation.

11. The underground pipe repair system of claim 10 wherein the processor is configured to activate the UV radiation curing device based upon detection of inflation of the inverted liner.

12. The underground pipe repair system of claim 10 wherein the processor is configured to activate the UV radiation curing device based upon internal pressure with the inflated liner exceeding a threshold pressure.

13. The underground pipe repair system of claim 10 wherein the processor is configured to activate the UV radiation curing device based upon a timer expiring.

14. The underground pipe repair system of claim 9 wherein the UV radiation curing device is positioned within the liner after inflation.

15. A method for operating an underground pipe repair system for repairing a pipe, the method comprising:
positioning a robot device with a liner assembly within the pipe, the robot device comprising
a plurality of sensors,
a processor coupled to the plurality of sensors,
an on-board power supply coupled to the plurality of sensors and the processor, and
a housing carrying the plurality of sensors, the processor, and the on-board power supply;
the liner assembly comprising a liner, the liner comprising
a proximal end directly coupled to an inflation tool, and
a distal end opposite the proximal end and to be positioned in at least one of the pipe and another pipe;
causing the robot device to move through the pipe;
causing the inflation tool to inflate the liner within the at least one of the pipe and another pipe; and
activating an electronic curing device to be positioned within the inflated liner to cure the inflated liner within the at least one of the pipe and another pipe.

16. The method of claim 15 wherein the liner comprises an inverted liner to be inverted within the at least one of the pipe and another pipe by the inflation tool; wherein the liner assembly comprises the electronic curing device coupled to the distal end and within the liner; and further comprising dragging the electronic curing device within the inverted liner during inflation.

17. The method of claim 16 further comprising activating the electronic curing device based upon detection of inflation of the inverted liner.

18. The method of claim 16 further comprising activating the electronic curing device based upon internal pressure with the inflated liner exceeding a threshold pressure.

19. The method of claim 16 further comprising activating the electronic curing device based upon a timer expiring.

20. The method of claim 15 further comprising positioning the electronic curing device within the liner after inflation.

* * * * *